(12) United States Patent
Watanabe et al.

(10) Patent No.: US 10,746,571 B2
(45) Date of Patent: Aug. 18, 2020

(54) CONDITION DETERMINATION APPARATUS AND METHOD, PHYSICAL QUANTITY INFORMATION GENERATION APPARATUS, AND ANGLE SENSOR

(71) Applicant: TDK CORPORATION, Tokyo (JP)

(72) Inventors: Kazuya Watanabe, Tokyo (JP); Hiraku Hirabayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 702 days.

(21) Appl. No.: 15/609,181

(22) Filed: May 31, 2017

(65) Prior Publication Data

US 2017/0356765 A1    Dec. 14, 2017

(30) Foreign Application Priority Data

Jun. 8, 2016    (JP) .................................. 2016-114599

(51) Int. Cl.
| | | |
|---|---|---|
| *G01D 5/165* | (2006.01) | |
| *G01D 3/10* | (2006.01) | |
| *G01D 5/14* | (2006.01) | |

(52) U.S. Cl.
CPC ............. *G01D 5/1655* (2013.01); *G01D 3/10* (2013.01); *G01D 5/145* (2013.01)

(58) Field of Classification Search
USPC ....................................................... 702/151
See application file for complete search history.

(56) References Cited

U.S. PATENT DOCUMENTS

| | | | | |
|---|---|---|---|---|
| 2007/0282558 A1* | 12/2007 | Sagisaka | ................ | B62D 5/049 |
| | | | | 702/116 |
| 2015/0077093 A1 | 3/2015 | Saito et al. | | |
| 2016/0069767 A1* | 3/2016 | Ishiba | ................... | G06F 3/0414 |
| | | | | 702/98 |
| 2019/0074780 A1* | 3/2019 | Furukawa | ................ | H02P 6/12 |

FOREIGN PATENT DOCUMENTS

| | | |
|---|---|---|
| JP | H7-218239 A | 8/1995 |
| JP | 2012-021842 A | 2/2012 |

* cited by examiner

*Primary Examiner* — Paul D Lee
(74) *Attorney, Agent, or Firm* — Oliff PLC

(57) ABSTRACT

An angle sensor includes a detection signal generation unit for generating a plurality of detection signals, an angle detection unit for generating a detected angle value by performing an operation using the plural of detection signals, and a condition determination apparatus. The condition determination apparatus includes a determination value generation unit and a determination unit. The determination value generation unit performs an operation using the plurality of detection signals to generate a determination value corresponding to the condition of the angle sensor. The determination value varies depending on an angle to be detected. The determination unit determines whether the angle sensor is in a predetermined condition by determining whether the determination value falls within a determination range. The determination unit varies at least one threshold value that represents at least one end of the determination range.

30 Claims, 14 Drawing Sheets

CONDITION DETERMINATION APPARATUS AND METHOD, PHYSICAL QUANTITY INFORMATION GENERATION APPARATUS, AND ANGLE SENSOR

BACKGROUND OF THE INVENTION

1. Field of the Invention

The present invention relates to a condition determination apparatus and a condition determination method for determining the condition of a physical quantity information generation apparatus such as an angle sensor, and to a physical quantity information generation apparatus and an angle sensor that include the condition determination apparatus.

2. Description of the Related Art

In recent years, angle sensors have been widely used in various applications, such as detection of the rotational position of a steering wheel or a power steering motor in an automobile. The angle sensors generate a detected angle value having a correspondence with an angle to be detected. Examples of the angle sensors include a magnetic angle sensor. A system using the magnetic angle sensor is typically provided with a magnetic field generation unit for generating a rotating magnetic field whose direction rotates in response to the rotation or linear movement of an object. The magnetic field generation unit is a magnet, for example. The angle to be detected by the magnetic angle sensor is, for example, the angle that the direction of the rotating magnetic field in a reference position forms with respect to a reference direction.

Among known angle sensors is one that includes a detection signal generation unit for generating a plurality of detection signals of different phases and generates a detected angle value by performing an operation using the plurality of detection signals. In a magnetic angle sensor, the detection signal generation unit includes a plurality of magnetic detection elements. Each of the plurality of magnetic detection elements includes, for example, a spin-valve magnetoresistance (MR) element including a magnetization pinned layer whose magnetization direction is pinned, a free layer whose magnetization direction varies depending on the direction of the rotating magnetic field, and a nonmagnetic layer located between the magnetization pinned layer and the free layer.

In the event of a failure of the angle sensor caused by a failure of the detection signal generation unit or other factors, some error exceeding an allowable range may be introduced in the detected angle value. The angle sensor thus needs to be provided with a function with which to detect a failure.

JP 2012-021842A describes a technology to detect a failure of a rotation angle detection apparatus that detects a rotation angle on the basis of two phase signals having 90° different phases. The technology detects the failure by monitoring the sum of squares of the two phase signals. JP 2012-021842A also describes a technology to detect a failure of a rotation angle detection apparatus that detects a rotation angle on the basis of three or more phase signals having equally different phases. The technology detects the failure by monitoring a total sum of the three or more phase signals.

US 2015/0077093 A1 describes a technology to detect a failure of a rotation angle detection apparatus that detects a rotation angle on the basis of first and second sinusoidal signals having a phase difference other than 90° or 180°. The technology detects the failure on the basis of the first and second sinusoidal signals and the phase difference therebetween.

According to the technology described in each of JP 2012-021842A and US 2015/0077093 A1, a determination value indicative of whether the rotation angle detection apparatus has failed is generated by performing an operation using a plurality of detection signals, and if the determination value exceeds a predetermined range, it is determined that the rotation angle detection apparatus has failed. When the rotation angle detection apparatus has not failed, the determination value ideally shows a constant ideal value regardless of the angle to be detected. In the event of a failure of the rotation angle detection apparatus, the determination value becomes different from the ideal value.

For the angle sensor that has the function of determining whether the angle sensor has failed by using such a determination value, the determination value may sometimes become different from the ideal value even if the angle sensor has not failed. For example, in the case of a magnetic angle sensor, ideally, the plurality of detection signals each have a waveform of a sinusoidal curve (including a sine waveform and a cosine waveform) when the direction of the rotating magnetic field changes with a constant angular velocity and the angle to be detected varies with a predetermined period. However, there are cases where the waveforms of the detection signals are distorted from a sinusoidal curve. Examples of causes for the distortion of the waveforms of the detection signals include a magnetic anisotropy of the free layer in the MR element in the magnetization direction of the magnetization pinned layer of the MR element, or variations of the magnetization direction of the magnetization pinned layer of the MR element due to the effect of the rotating magnetic field or other factors. If the waveforms of the detection signals are distorted, the determination value can become different from the ideal value without a failure of the angle sensor.

For the angle sensor, the phase of at least one of the detection signals can deviate from a desired phase in the light of accuracy of manufacture or other factors. In such a case also, the determination value can become different from the ideal value without a failure of the angle sensor.

A determination value differing from the ideal value without a failure of the angle sensor leads to lower accuracy of determination whether the angle sensor has failed.

The foregoing problem applies not only to the case where the determination value is used to determine whether the angle sensor has failed, but generally applies to the cases of determining a condition of a physical quantity information generation apparatus for generating information having a correspondence with a predetermined physical quantity. The angle sensor is an example of the physical quantity information generation apparatus. The angle to be detected corresponds to the predetermined physical quantity. The detected angle value corresponds to the information having a correspondence with the foregoing predetermined physical quantity. Determining whether the angle sensor has failed is an example of determining the condition of the physical quantity information generation apparatus. In the case of determining the condition of the physical quantity information generation apparatus by using a determination value corresponding to the condition of the physical quantity information generation apparatus, variations in the determination value depending on the predetermined physical quantity lead to lower accuracy of determination of the condition.

SUMMARY OF THE INVENTION

It is an object of the present invention to provide a condition determination apparatus and a condition determination method that enable accurate determination of the condition of a physical quantity information generation apparatus, and to provide a physical quantity information generation apparatus and an angle sensor that include the condition determination apparatus.

A condition determination apparatus of the present invention is configured to determine the condition of a physical quantity information generation apparatus for generating information having a correspondence with a predetermined physical quantity. The condition determination apparatus of the present invention includes: a determination value generation unit for generating at least one determination value corresponding to the condition of the physical quantity information generation apparatus; and a determination unit for determining whether the physical quantity information generation apparatus is in a predetermined condition by determining whether the at least one determination value falls within a determination range. When the physical quantity information generation apparatus is in the predetermined condition, the at least one determination value varies depending on the predetermined physical quantity. The determination unit defines at least one threshold value that represents at least one end of the determination range, and varies the at least one threshold value so as to bring a variation of a difference between the at least one threshold value and the at least one determination value depending on the predetermined physical quantity when the physical quantity information generation apparatus is in the predetermined condition into a narrower range than a range over which the at least one determination value varies depending on the predetermined physical quantity when the physical quantity information generation apparatus is in the predetermined condition.

In the condition determination apparatus of the present invention, the predetermined condition may be a condition in which the physical quantity information generation apparatus has not failed.

In the condition determination apparatus of the present invention, the predetermined physical quantity may be an angle to be detected. The physical quantity information generation apparatus may be an angle sensor including a detection signal generation unit and an angle detection unit. The detection signal generation unit generates a plurality of detection signals each having a correspondence with the angle to be detected. The angle detection unit performs an operation using the plurality of detection signals to generate a detected angle value having a correspondence with the angle to be detected, as the information having a correspondence with the predetermined physical quantity. In such a case, the determination value generation unit may generate the at least one determination value by performing an operation using the plurality of detection signals. The determination unit may vary the at least one threshold value by using at least one of the plurality of detection signals.

In the condition determination apparatus of the present invention, the angle to be detected may be an angle that the direction of a rotating magnetic field in a reference position forms with respect to a reference direction.

In the condition determination apparatus of the present invention, when the angle to be detected varies with a predetermined period, each of the plurality of detection signals may contain an ideal component which varies periodically in such a manner as to trace an ideal sinusoidal curve, and an error component. In such a case, the ideal components of the plurality of detection signals are different in phase from each other and have a predetermined phase relationship with each other. The variation of the at least one determination value when the physical quantity information generation apparatus is in the predetermined condition results from the error component.

In the condition determination apparatus of the present invention, the plurality of detection signals may be a first, a second and a third detection signal of which the ideal components are different in phase from each other by 120°. In such a case, the at least one determination value may be one determination value. The determination value generation unit may generate the one determination value by performing an operation including determining the sum of the first to third detection signals.

In the condition determination apparatus of the present invention, the plurality of detection signals may be a first, a second, a third and a fourth detection signal, the ideal components of the first and second detection signals being different in phase from each other by 180°, the ideal components of the third and fourth detection signals being different in phase from each other by 180°. The ideal components of the first and third detection signals are different in phase from each other by 90°. In such a case, the at least one determination value may be a first determination value and a second determination value. The determination value generation unit may generate the first determination value by performing an operation including determining the sum of the first detection signal and the second detection signal, and generate the second determination value by performing an operation including determining the sum of the third detection signal and the fourth detection signal.

In the condition determination apparatus of the present invention, when the plurality of detection signals are the foregoing first to fourth detection signals, the at least one determination value may be one determination value. The determination value generation unit may generate the one determination value by performing an operation including determining the sum of the square of a difference between the first detection signal and the second detection signal and the square of a difference between the third detection signal and the fourth detection signal.

In the condition determination apparatus of the present invention, the plurality of detection signals may be a first detection signal and a second detection signal of which the ideal components are different in phase from each other by 90°. In such a case, the at least one determination value may be one determination value. The determination value generation unit may generate the one determination value by performing an operation including determining the sum of the square of the first detection signal and the square of the second detection signal.

A condition determination method of the present invention is a method for determining the condition of a physical quantity information generation apparatus for generating information having a correspondence with a predetermined physical quantity. The condition determination method of the present invention includes: a step of generating at least one determination value corresponding to the condition of the physical quantity information generation apparatus; and a determination step of determining whether the physical quantity information generation apparatus is in a predetermined condition by determining whether the at least one determination value falls within a determination range. When the physical quantity information generation apparatus is in the predetermined condition, the at least one determination value varies depending on the predetermined physical quantity. The determination step defines at least one threshold value that represents at least one end of the determination range, and varies the at least one threshold value so as to bring a variation of a difference between the at least one threshold value and the at least one determination value depending on the predetermined physical quantity when the physical quantity information generation apparatus is in the predetermined condition into a narrower range than a range over which the at least one determination value varies depending on the predetermined physical quantity when the physical quantity information generation apparatus is in the predetermined condition.

In the condition determination method of the present invention, the predetermined condition may be a condition in which the physical quantity information generation apparatus has not failed.

In the condition determination method of the present invention, the predetermined physical quantity may be an angle to be detected. The physical quantity information generation apparatus may be an angle sensor including a detection signal generation unit and an angle detection unit. The detection signal generation unit generates a plurality of detection signals each having a correspondence with the angle to be detected. The angle detection unit performs an operation using the plurality of detection signals to generate a detected angle value having a correspondence with the angle to be detected, as the information having a correspondence with the predetermined physical quantity. In such a case, the at least one determination value may be generated by an operation using the plurality of detection signals. The determination step may vary the at least one threshold value by using at least one of the plurality of detection signals.

In the condition determination method of the present invention, the angle to be detected may be an angle that the direction of a rotating magnetic field in a reference position forms with respect to a reference direction.

In the condition determination method of the present invention, when the angle to be detected varies with a predetermined period, each of the plurality of detection signals may contain an ideal component which varies periodically in such a manner as to trace an ideal sinusoidal curve, and an error component. In such a case, the ideal components of the plurality of detection signals are different in phase from each other and have a predetermined phase relationship with each other. The variation of the at least one determination value when the physical quantity information generation apparatus is in the predetermined condition results from the error component.

In the condition determination method of the present invention, the plurality of detection signals may be a first, a second and a third detection signal of which the ideal components are different in phase from each other by 120°. In such a case, the at least one determination value may be one determination value. The one determination value may be generated by an operation including determining the sum of the first to third detection signals.

In the condition determination method of the present invention, the plurality of detection signals may be a first, a second, a third and a fourth detection signal, the ideal components of the first and second detection signals being different in phase from each other by 180°, the ideal components of the third and fourth detection signals being different in phase from each other by 180°. The ideal components of the first and third detection signals are different in phase from each other by 90°. In such a case, the at least one determination value may be a first and a second determination value. The first determination value may be generated by an operation including determining the sum of the first detection signal and the second detection signal. The second determination value may be generated by an operation including determining the sum of the third detection signal and the fourth detection signal.

In the condition determination method of the present invention, when the plurality of detection signals are the foregoing first to fourth detection signals, the at least one determination value may be one determination value. The one determination value may be generated by an operation including determining the sum of the square of a difference between the first detection signal and the second detection signal and the square of a difference between the third detection signal and the fourth detection signal.

In the condition determination method of the present invention, the plurality of detection signals may be a first detection signal and a second detection signal of which the ideal components are different in phase from each other by 90°. In such a case, the at least one determination value may be one determination value. The one determination value may be generated by an operation including determining the sum of the square of the first detection signal and the square of the second detection signal.

A physical quantity information generation apparatus of the present invention includes a physical quantity information generation unit for generating information having a correspondence with a predetermined physical quantity, and the condition determination apparatus of the present information. The determination unit of the condition determination apparatus defines at least one threshold value that represents at least one end of the determination range, and varies the at least one threshold value so as to bring a variation of a difference between the at least one threshold value and the at least one determination value depending on the predetermined physical quantity when the physical quantity information generation apparatus is in the predetermined condition into a narrower range than a range over which the at least one determination value varies depending on the predetermined physical quantity when the physical quantity information generation apparatus is in the predetermined condition. The predetermined condition may be a condition in which the physical quantity information generation apparatus has not failed.

An angle sensor of the present invention includes a detection signal generation unit, an angle detection unit, and a condition determination apparatus. The detection signal generation unit generates a plurality of detection signals each having a correspondence with an angle to be detected. The angle detection unit performs an operation using the plurality of detection signals to generate a detected angle value having a correspondence with the angle to be detected. The condition determination apparatus includes: a determination value generation unit for generating at least one determination value corresponding to the condition of the angle sensor; and a determination unit for determining whether the angle sensor is in a predetermined condition by determining whether the at least one determination value falls within a determination range. When the angle sensor is in the predetermined condition, the at least one determination value varies depending on the angle to be detected. The determination unit defines at least one threshold value that represents at least one end of the determination range, and varies the at least one threshold value so as to bring a variation of a difference between the at least one threshold value and the at least one determination value depending on the angle to be detected when the angle sensor is in the predetermined condition into a narrower range than a range over which the at least one determination value varies depending on the angle to be detected when the angle sensor is in the predetermined condition.

In the angle sensor of the present invention, the predetermined condition may be a condition in which the angle sensor has not failed.

In the angle sensor of the present invention, the determination value generation unit may generate the at least one determination value by performing an operation using the plurality of detection signals. The determination unit may vary the at least one threshold value by using at least one of the plurality of detection signals.

In the angle sensor of the present invention, the angle to be detected may be an angle that the direction of a rotating magnetic field in a reference position forms with respect to a reference direction. The detection signal generation unit may include a plurality of detection circuits for generating the plurality of detection signals. Each of the plurality of detection circuits may include at least one magnetic detection element for detecting the rotating magnetic field.

The at least one magnetic detection element may include a plurality of magnetoresistance elements connected in series. Each of the plurality of magnetoresistance elements may include a magnetization pinned layer whose magnetization direction is pinned, a free layer whose magnetization direction varies depending on the direction of the rotating magnetic field, and a nonmagnetic layer located between the magnetization pinned layer and the free layer.

In the angle sensor of the present invention, when the angle to be detected varies with a predetermined period, each of the plurality of detection signals may contain an ideal component which varies periodically in such a manner as to trace an ideal sinusoidal curve, and an error component. In such a case, the ideal components of the plurality of detection signals are different in phase from each other and have a predetermined phase relationship with each other. The variation of the at least one determination value when the angle sensor is in the predetermined condition results from the error component.

In the angle sensor of the present invention, the plurality of detection signals may be a first, a second and a third detection signal of which the ideal components are different in phase from each other by 120°. In such a case, the at least one determination value may be one determination value. The determination value generation unit may generate the one determination value by performing an operation including determining the sum of the first to third detection signals.

In the angle sensor of the present invention, the plurality of detection signals may be a first, a second, a third and a fourth detection signal, the ideal components of the first and second detection signals being different in phase from each other by 180°, the ideal components of the third and fourth detection signals being different in phase from each other by 180°. The ideal components of the first and third detection signals are different in phase from each other by 90°. In such a case, the at least one determination value may be a first and a second determination value. The determination value generation unit may generate the first determination value by performing an operation including determining the sum of the first detection signal and the second detection signal, and generate the second determination value by performing an operation including determining the sum of the third detection signal and the fourth detection signal.

In the angle sensor of the present invention, when the plurality of detection signals are the foregoing first to fourth detection signals, the at least one determination value may be one determination value. The determination value generation unit may generate the one determination value by performing an operation including determining the sum of the square of a difference between the first detection signal and the second detection signal and the square of a difference between the third detection signal and the fourth detection signal.

In the angle sensor of the present invention, the plurality of detection signals may be a first detection signal and a second detection signal of which the ideal components are different in phase from each other by 90°. In such a case, the at least one determination value may be one determination value. The determination value generation unit may generate the one determination value by performing an operation including determining the sum of the square of the first detection signal and the square of the second detection signal.

According to the condition determination apparatus and method and the physical quantity information generation apparatus of the present invention, at least one threshold value to be used for determining whether the physical quantity information generation apparatus is in a predetermined condition is varied as described above. This enables accurate determination of the condition of the physical quantity information generation apparatus. Further, according to the angle sensor of the present invention, at least one threshold to be used for determining whether the angle sensor is in a predetermined condition is varied as described above. This enables accurate determination of the condition of the angle sensor.

Other and further objects, features and advantages of the present invention will appear more fully from the following description.

DETAILED DESCRIPTION OF THE PREFERRED EMBODIMENTS

A plurality of preferred embodiments of the present invention described below relate to a condition determination apparatus and a condition determination method for determining the condition of a physical quantity information generation apparatus for generating information having a correspondence with a predetermined physical quantity, and relate to a physical quantity information generation apparatus and an angle sensor including the condition determination apparatus. In the plurality of preferred embodiments, the physical quantity information generation apparatus includes a physical quantity information generation unit for generating the information having a correspondence with the predetermined physical quantity, and the aforementioned condition determination apparatus. An example of the physical quantity information generation apparatus is an angle sensor. The plurality of preferred embodiments will be described in detail below with reference to an example in which the physical quantity information generation apparatus is an angle sensor.

First Embodiment

Figure 1:
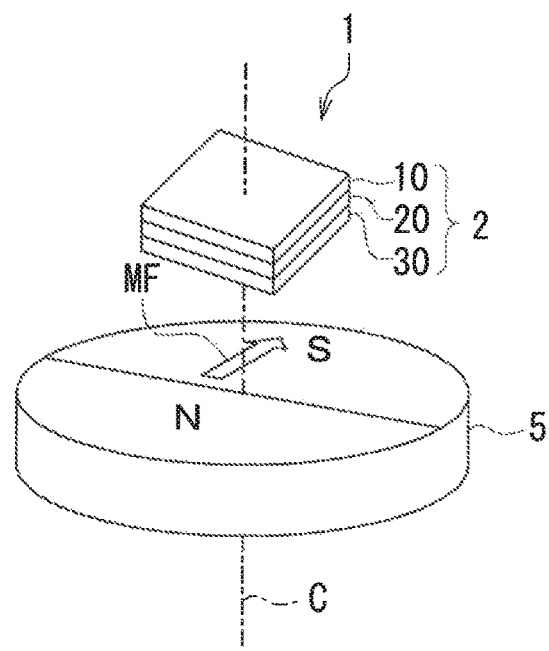
FIG. 1 is a perspective view illustrating the general configuration of an angle sensor system including an angle sensor according to a first embodiment of the invention.

First, reference is made to FIG. 1 to describe the general configuration of an angle sensor system including an angle sensor according to a first embodiment of the invention.

The angle sensor 1 according to the first embodiment is configured to generate a detected angle value θs having a correspondence with an angle θ to be detected. The angle θ to be detected corresponds to the aforementioned predetermined physical quantity. The detected angle value θs corresponds to the information having a correspondence with the predetermined physical quantity.

The angle sensor 1 according to the present embodiment is a magnetic angle sensor, in particular. As shown in FIG. 1, the angle sensor 1 according to the present embodiment detects a rotating magnetic field MF whose direction rotates. In this case, the angle θ to be detected is the angle that the direction of the rotating magnetic field MF in a reference position forms with respect to a reference direction. The angle sensor system shown in FIG. 1 includes the angle sensor 1, and a magnet 5 having a cylindrical shape, which is an example of means for generating the rotating magnetic field MF. The magnet 5 has an N pole and an S pole that are arranged symmetrically with respect to an imaginary plane including the central axis of the cylindrical shape. The magnet 5 rotates about the central axis of the cylindrical shape. Consequently, the direction of the rotating magnetic field MF generated by the magnet 5 rotates about a center of rotation C including the central axis of the cylindrical shape.

The reference position is located within an imaginary plane parallel to an end face of the magnet 5. This imaginary plane will hereinafter be referred to as the reference plane. In the reference plane, the direction of the rotating magnetic field MF generated by the magnet 5 rotates about the reference position. The reference direction is located within the reference plane and intersects the reference position. In the following description, the direction of the rotating magnetic field MF in the reference position refers to a direction located within the reference plane. The angle sensor 1 is placed to face the aforementioned end face of the magnet 5.

The angle sensor system of the present embodiment may be configured in other ways than illustrated in FIG. 1. The angle sensor system of the present embodiment need only be configured to vary the relative positional relationship between the angle sensor 1 and the means for generating the rotating magnetic field MF so that the direction of the rotating magnetic field MF in the reference position rotates when viewed from the angle sensor 1. For example, the magnet 5 and the angle sensor 1 arranged as illustrated in FIG. 1 may be configured so that: the angle sensor 1 rotates while the magnet 5 is fixed; the magnet 5 and the angle sensor 1 rotate in mutually opposite directions; or the magnet 5 and the angle sensor 1 rotate in the same direction with mutually different angular velocities.

Alternatively, a magnet that includes one or more pairs of N and S poles arranged alternately in an annular shape may be employed in place of the magnet 5, and the angle sensor 1 may be placed in the vicinity of the outer circumference of the magnet. In such a case, at least one of the magnet and the angle sensor 1 rotates.

Alternatively, a magnetic scale that includes a plurality of pairs of N and S poles arranged alternately in a liner configuration may be employed in place of the magnet 5, and the angle sensor 1 may be placed in the vicinity of the periphery of the magnetic scale. In such a case, at least one of the magnetic scale and the angle sensor 1 moves linearly in the direction in which the N and S poles of the magnetic scale are aligned.

In the above-described various configurations of the angle sensor system, there also exists the reference plane having a predetermined positional relationship with the angle sensor 1, and in the reference plane, the direction of the rotating magnetic field MF rotates about the reference position when viewed from the angle sensor 1.

The angle sensor 1 includes a detection signal generation unit 2 for generating a first, a second and a third detection signal S11, S12 and S13 each having a correspondence with the angle θ to be detected. The detection signal generation unit 2 includes a first detection circuit 10 for generating the first detection signal S11, a second detection circuit 20 for generating the second detection signal S12, and a third detection circuit 30 for generating the third detection signal S13. For ease of understanding, FIG. 1 illustrates the first to third detection circuits 10, 20 and 30 as separate components. However, the first to third detection circuits 10, 20 and 30 may be integrated into a single component. Further, while in FIG. 1 the first to third detection circuits 10, 20 and 30 are stacked in a direction parallel to the center of rotation C, the order of stacking may be other than that shown in FIG. 1. Each of the first to third detection circuits 10, 20 and 30 includes at least one magnetic detection element for detecting the rotating magnetic field MF.

Figure 2:
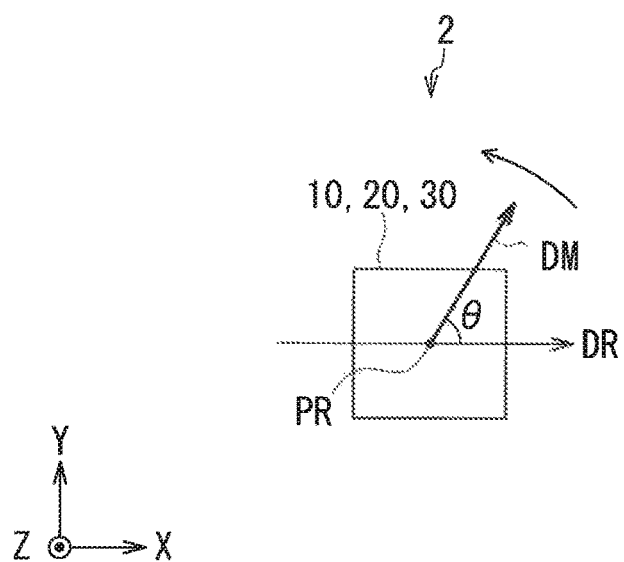
FIG. 2 is an explanatory diagram illustrating the definitions of directions and angles used in the first embodiment of the invention.

Definitions of directions and angles used in the present embodiment will now be described with reference to FIG. 1 and FIG. 2. First, Z direction is the direction parallel to the center of rotation C shown in FIG. 1 and from bottom to top in FIG. 1. FIG. 2 illustrates the Z direction as the direction out of the plane of FIG. 2. Next, X and Y directions are two directions that are perpendicular to the Z direction and orthogonal to each other. FIG. 2 illustrates the X direction as the rightward direction, and the Y direction as the upward direction. Further, -X direction is the direction opposite to the X direction, and -Y direction is the direction opposite to the Y direction.

The reference position PR is the position where the angle sensor 1 detects the rotating magnetic field MF. The reference direction DR shall be the X direction. As mentioned above, the angle θ to be detected is the angle that the direction DM of the rotating magnetic field MF in the reference position PR forms with respect to the reference direction DR. The direction DM of the rotating magnetic field MF shall rotate counterclockwise in FIG. 2. The angle θ will be expressed in positive values when seen counterclockwise from the reference direction DR, and in negative values when seen clockwise from the reference direction DR.

Figure 3:
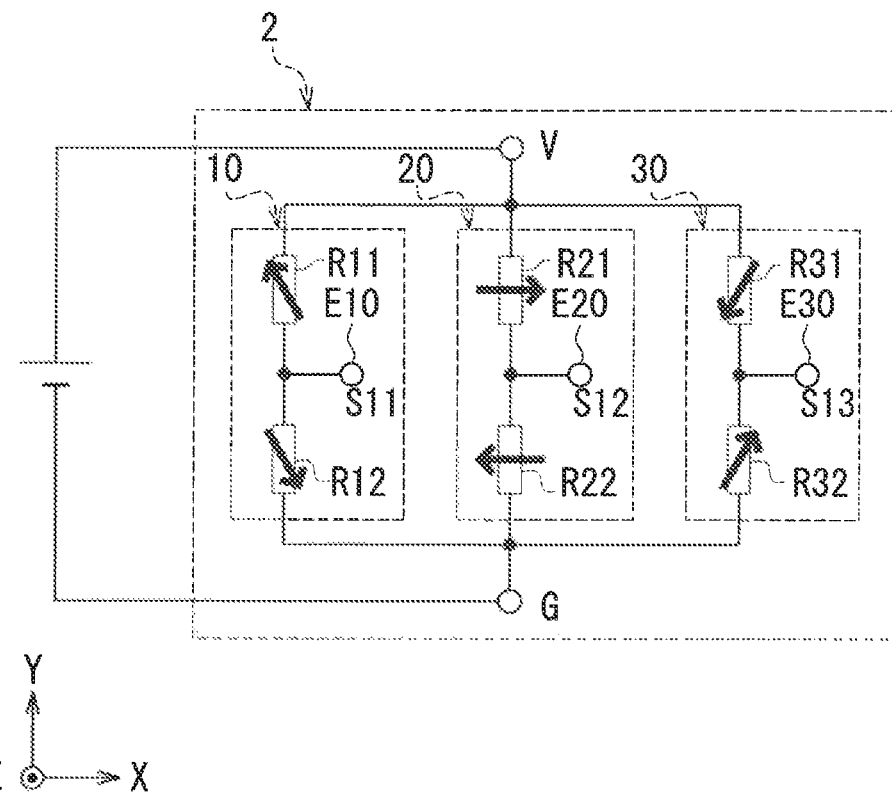
FIG. 3 is a circuit diagram illustrating the configuration of a detection signal generation unit of the angle sensor according to the first embodiment of the invention.

The configuration of the detection signal generation unit 2 will now be described in detail with reference to FIG. 3. FIG. 3 is a circuit diagram illustrating the configuration of the detection signal generation unit 2. As mentioned above, the detection signal generation unit 2 includes the first detection circuit 10, the second detection circuit 20, and the third detection circuit 30. The detection signal generation unit 2 further includes a power supply port V and a ground port G. A power supply voltage of predetermined magnitude, such as 5 volts, is applied between the power supply port V and the ground port G.

As the direction DM of the rotating magnetic field MF rotates with a predetermined period, the angle θ to be detected varies with the predetermined period. In such a case, all the first to third detection signals S11, S12 and S13 vary periodically with a signal period equal to the predetermined period. The first to third detection signals S11, S12 and S13 are different in phase from each other.

The first detection circuit 10 includes a pair of serially connected magnetic detection elements R11 and R12, and an output port E10. One end of the magnetic detection element R11 is connected to the power supply port V. The other end of the magnetic detection element R11 is connected to one end of the magnetic detection element R12 and the output port E10. The other end of the magnetic detection element R12 is connected to the ground port G. The output port E10 outputs the first detection signal S11 which corresponds to the potential at the connection point between the magnetic detection elements R11 and R12.

The second detection circuit 20 includes a pair of serially connected magnetic detection elements R21 and R22, and an output port E20. One end of the magnetic detection element R21 is connected to the power supply port V. The other end of the magnetic detection element R21 is connected to one end of the magnetic detection element R22 and the output port E20. The other end of the magnetic detection element R22 is connected to the ground port G. The output port E20 outputs the second detection signal S12 which corresponds to the potential at the connection point between the magnetic detection elements R21 and R22.

The third detection circuit 30 includes a pair of serially connected magnetic detection elements R31 and R32, and an output port E30. One end of the magnetic detection element R31 is connected to the power supply port V. The other end of the magnetic detection element R31 is connected to one end of the magnetic detection element R32 and the output port E30. The other end of the magnetic detection element R32 is connected to the ground port G. The output port E30 outputs the third detection signal S13 which corresponds to the potential at the connection point between the magnetic detection elements R31 and R32.

In the present embodiment, each of the magnetic detection elements R11, R12, R21, R22, R31 and R32 includes a plurality of magnetoresistance (MR) elements connected in series. Each of the plurality of MR elements is a spin-valve MR element, for example. The spin-valve MR element includes a magnetization pinned layer whose magnetization direction is pinned, a free layer which is a magnetic layer whose magnetization direction varies depending on the direction DM of the rotating magnetic field MF, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The spin-valve MR element varies in resistance depending on the angle that the magnetization direction of the free layer forms with respect to the magnetization direction of the magnetization pinned layer, and has a minimum resistance When the foregoing angle is 0° and a maximum resistance when the foregoing angle is 180°. In FIG. 3, each arrow drawn to overlap a magnetic detection element indicates the magnetization direction of the magnetization pinned layers of the MR elements included in the magnetic detection element.

In the first detection circuit 10, the magnetization pinned layers of the MR elements included in the magnetic detection element R11 are magnetized in a direction that is rotated counterclockwise from the X direction by 120°. This magnetization direction will hereinafter be referred to as the first direction D1. The magnetization pinned layers of MR elements included in the magnetic detection element R12 are magnetized in the opposite direction to the first direction D1. In the first detection circuit 10, the potential at the connection point between the magnetic detection elements R11 and R12 varies depending on the strength of a component in the first direction D1 of the rotating magnetic field MF. Thus, the first detection circuit 10 detects the strength of the component in the first direction D1 of the rotating magnetic field MF and generates a signal indicative of the strength as the first detection signal S11. The strength of the component in the first direction D1 of the rotating magnetic field MF has a correspondence with the angle θ to be detected.

In the second detection circuit 20, the magnetization pinned layers of the MR elements included in the magnetic detection element R21 are magnetized in the X direction. This magnetization direction will hereinafter be referred to as the second direction D2. The magnetization pinned layers of the MR elements included in the magnetic detection element R22 are magnetized in the opposite direction to the second direction D2, that is, in the −X direction. In the second detection circuit 20, the potential at the connection point between the magnetic detection elements R21 and R22 varies depending on the strength of a component in the second direction D2 of the rotating magnetic field MF. Thus, the second detection circuit 20 detects the strength of the component in the second direction D2 of the rotating magnetic field MF and generates a signal indicative of the strength as the second detection signal S12. The strength of the component in the second direction D2 of the rotating magnetic field MF has a correspondence with the angle θ to be detected.

In the third detection circuit 30, the magnetization pinned layers of the MR elements included in the magnetic detection element R31 are magnetized in a direction that is rotated clockwise from the X direction by 120°. This magnetization direction will hereinafter be referred to as the third direction D3. The magnetization pinned. layers of MR elements included in the magnetic detection element R32 are magnetized in the opposite direction to the third direction D3. In the third detection circuit 30, the potential at the connection point between the magnetic detection elements R31 and R32 varies depending on the strength of a component in the third direction D3 of the rotating magnetic field MF. Thus, the third detection circuit 30 detects the strength of the component in the third direction D3 of the rotating magnetic field MF and generates a signal indicative of the strength as the third detection signal S13. The strength of the component in the third direction D3 of the rotating magnetic field MF has a correspondence with the angle θ to be detected.

In the light of the production accuracy of the MR elements or other factors, the magnetization directions of the magnetization pinned layers of the plurality of MR elements in the detection circuits 10, 20 and 30 may be slightly different from those described above.

Figure 6:
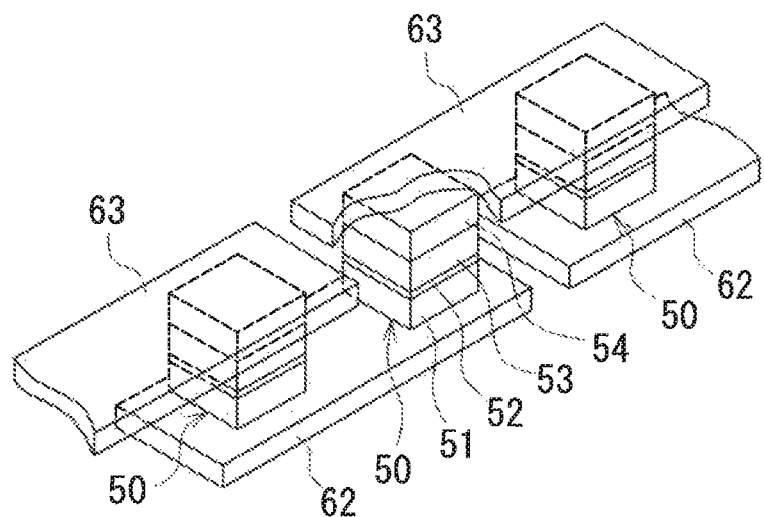
FIG. 6 is a perspective view of a portion of a magnetic detection element shown in FIG. 3.

An example of the configuration of the magnetic detection elements will now be described with reference to FIG. 6. FIG. 6 is a perspective view illustrating a portion of a magnetic detection element in the detection signal generation unit 2 shown in FIG. 3. In this example, the magnetic detection element includes a plurality of lower electrodes 62, a plurality of MR elements 50 and a plurality of upper electrodes 63. The plurality of lower electrodes 62 are arranged on a substrate (not illustrated). Each of the lower electrodes 62 has a long slender shape. Every two lower electrodes 62 that are adjacent to each other in the longitudinal direction of the lower electrodes 62 have a gap therebetween. As shown in FIG. 6, MR elements 50 are provided on the top surfaces of the lower electrodes 62, near opposite ends in the longitudinal direction. Each of the MR elements 50 includes a free layer 51, a nonmagnetic layer 52, a magnetization pinned layer 53, and an antiferromagnetic layer 54 which are stacked in this order, the free layer 51 being closest to the lower electrode 62. The free layer 51 is electrically connected to the lower electrode 62. The antiferromagnetic layer 54 is formed of an antiferromagnetic material. The antiferromagnetic layer 54 is in exchange coupling with the magnetization pinned layer 53 so as to pin the magnetization direction of the magnetization pinned layer 53. The plurality of upper electrodes 63 are arranged over the plurality of MR elements 50. Each of the upper electrodes 63 has a long slender shape, and establishes electrical connection between the respective antiferromagnetic layers 54 of two adjacent MR elements 50 that are arranged on two lower electrodes 62 adjacent in the longitudinal direction of the lower electrodes 62. With such a configuration, the plurality of MR elements 50 in the magnetic detection element shown in FIG. 6 are connected in series by the plurality of lower electrodes 62 and the plurality of upper electrodes 63. It should be appreciated that the layers 51 to 54 of the MR elements 50 may be stacked in an order reverse to that shown in FIG. 6.

As described previously, when the angle θ to be detected varies with the predetermined period, all the first to third detection signals S11, S12 and S13 vary periodically with the signal period equal to the predetermined period. When the angle θ to be detected varies with the predetermined period, each of the detection signals S11, S12 and S13 contains an ideal component and an error component other than the deal component. The ideal component varies periodically in such a manner as to trace an ideal sinusoidal curve (including a sine waveform and a cosine waveform). The ideal components of the detection signals S11, S12 and S13 are different in phase from each other and have a predetermined phase relationship with each other. In the present embodiment, the ideal components of the detection signals S11, S12 and S13 are different in phase from each other by 120°. The following description assumes that all the first to third detection signals S11, S12 and S13 are adjusted in level so that the centers of changes of their ideal components come to zero.

The error components of the detection signals S11, S12 and S13 are caused by such factors as a magnetic anisotropy of the free layer 51 of the MR element 50 in the magnetization direction of the magnetization pinned layer 53 of the MR element 50, or a variation of the magnetization direction of the magnetization pinned layer 53 of the MR element 50 due to the effect of the rotating magnetic field MR or other factors. The error components caused by the foregoing factors are mainly equivalent to the third harmonic of the ideal component. Hereinafter, an error component equivalent to the third harmonic of the ideal component will be referred to as the third harmonic error component.

Aside from the third harmonic error component, the error components may include an error component equivalent to a harmonic other than the third harmonic of the ideal component, and an error component that has the same period as that of the ideal component and a different phase from that of the ideal component. Hereinafter, the error component that has the same period as that of the ideal component and a different phase from that of the ideal component will be referred to as the first-order error component. The first-order error component acts to shift the phase of a detection signal from that of the ideal component. For example, the first-order error component occurs when the magnetization directions of the magnetization pinned layers of the plurality of MR elements in the detection circuits 10, 20, and 30 deviate from respective desired directions.

Figure 4:
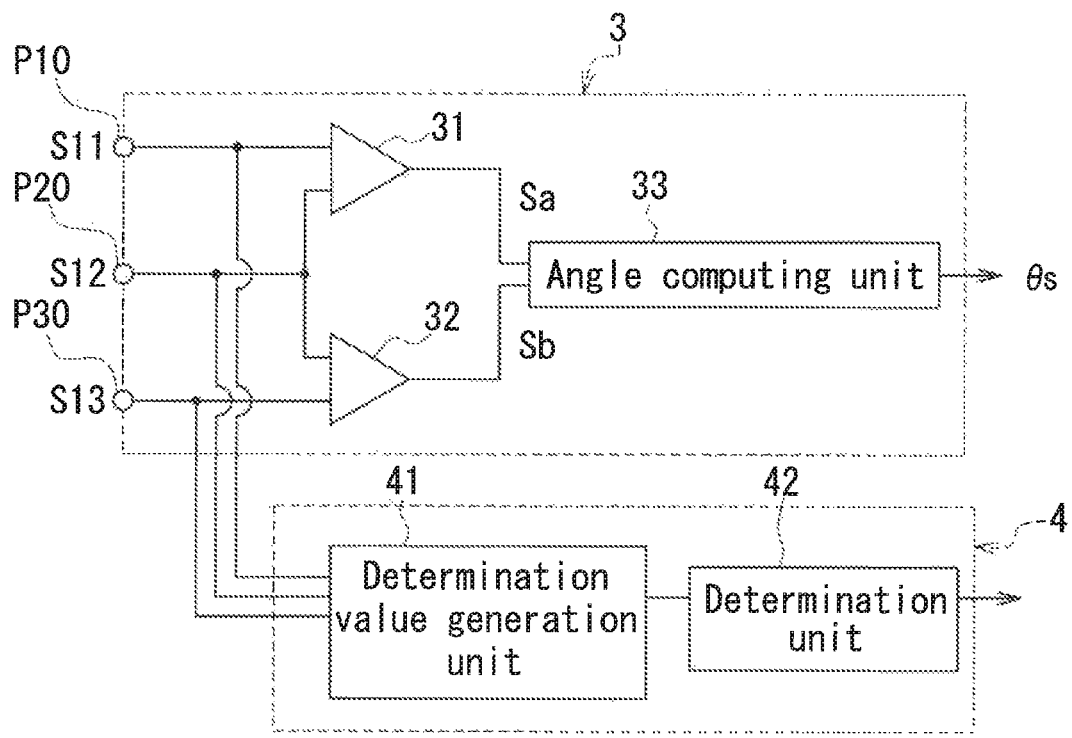
FIG. 4 is a functional block diagram illustrating the configuration of an angle detection unit and a condition determination apparatus of the angle sensor according to the first embodiment of the invention.

Now, components of the angle sensor 1 other than the detection signal generation unit 2 will be described with reference to FIG. 4. The angle sensor 1 includes an angle detection unit 3 and a condition determination apparatus 4 shown in FIG. 4, in addition to the detection signal generation unit 2. The detection signal generation unit 2 and the angle detection unit 3 correspond to the physical quantity information generation unit. The condition determination apparatus 4 determines whether the angle sensor 1 as the physical quantity information generation unit is in a predetermined condition. In the present embodiment, the predetermined condition is particularly a condition in which the physical quantity information generation apparatus or the angle sensor 1 has not failed. The condition determination apparatus 4 thus detects a failure of the angle sensor 1. FIG. 4 is a functional block diagram illustrating the configuration of the angle detection unit 3 and the condition determination apparatus 4. The angle detection unit 3 and the condition determination apparatus 4 can be implemented by an application-specific integrated circuit (ASIC) or a microcomputer, for example.

The angle detection unit 3 performs an operation using the first to third detection signals S11, S12 and S13 to generate the detected angle value θs having a correspondence with the angle θ to be detected. The angle detection unit 3 includes input ports P10, P20 and P30 for receiving the detection signals S11, S12 and S13, respectively. The angle detection unit 3 further includes computing units 31 and 32 and an angle computing unit 33.

The computing unit 31 generates a signal Sa indicative of a difference between the detection signal S11 received at the input port P10 and the detection signal S12 received at the input port P20. The computing unit 32 generates a signal Sb indicative of a difference between the detection signal S13 received at the input port P30 and the detection signal S12 received at the input port P20. The angle computing unit 33 generates the detected angle value θs by performing an operation using the signals Sa and Sb generated by the computing units 31 and 32. The signals Sa and Sb are expressed by the following Eqs. (1) and (2), respectively.

$$Sa = S11 - S12 \quad (1)$$

$$Sb = S13 - S12 \quad (2)$$

Figure 7:
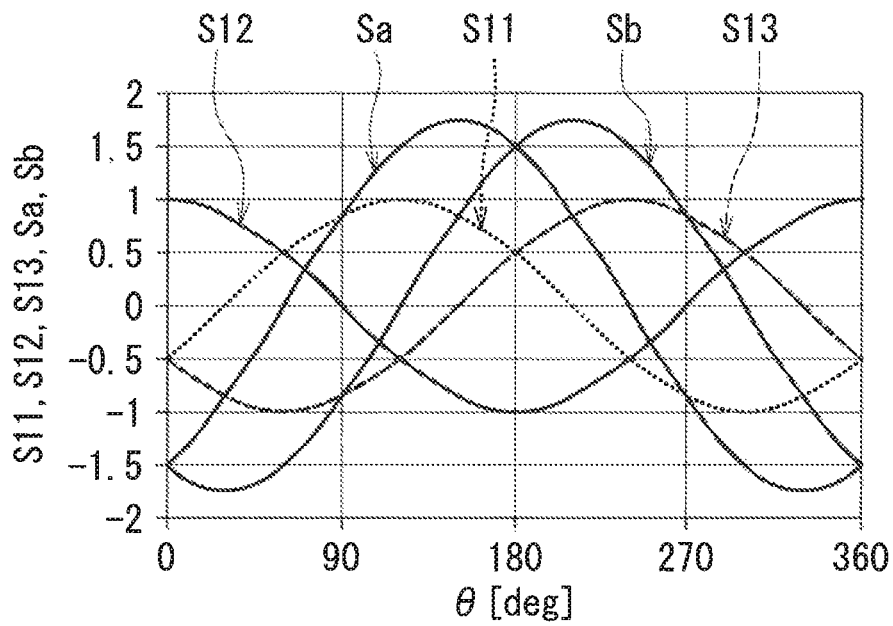
FIG. 7 is a waveform diagram illustrating the waveforms of a plurality of signals for use in the generation of a detected angle value by the angle detection unit shown in FIG. 4.

FIG. 7 is a waveform diagram illustrating the waveforms of the first to third detection signals S11, S12 and S13 and the signals Sa and Sb. In FIG. 7, the horizontal axis represents the angle θ to be detected, and the vertical axis represents the signals S11, S12, S13, Sa and Sb in relative values.

Figure 5:
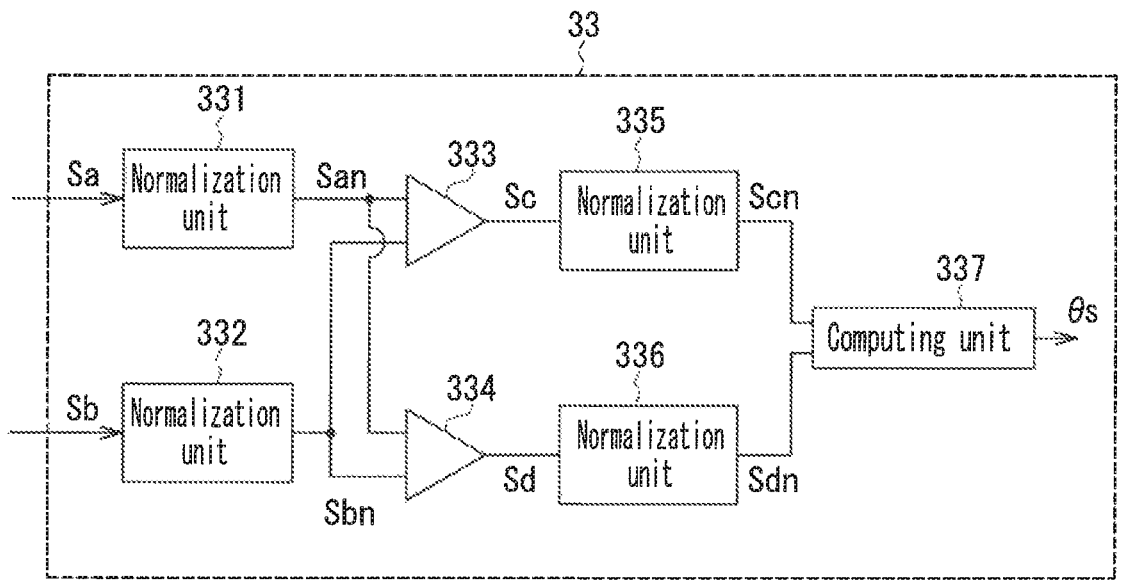
FIG. 5 is a functional block diagram illustrating the configuration of an angle computing unit shown in FIG. 4.

FIG. 5 is a functional block diagram illustrating the configuration of the angle computing unit 33 shown in FIG. 4. As shown in FIG. 5, the angle computing unit 33 includes normalization units 331, 332, 335 and 336, an adder unit 333, a subtractor unit 334, and a computing unit 337.

The normalization unit 331 normalizes the signal Sa to generate a signal San. The normalization unit 332 normalizes the signal Sb to generate a signal Sbn. The normalization units 331 and 332 normalize the signals Sa and Sb to generate the signals San and Sbn so that the signals San and Sbn both have a maximum value of 1 and a minimum value of −1.

The adder unit 333 adds up the signals San and Sbn to generate a signal Sc. The subtractor unit 334 subtracts the signal Sbn from the signal San to generate a signal Sd.

The normalization unit 335 normalizes the signal Sc to generate a signal Scn. The normalization unit 336 normalizes the signal Sd to generate a signal Sdn. The normalization units 335 and 336 normalize the signals Sc and Sd to generate the signals Scn and Sdn so that the signals Scn and Sdn both have a maximum value of 1 and a minimum value of −1.

The computing unit 337 performs an operation expressed by the following Eq. (3) to generate the detected angle value θs. Note that "atan" in Eq. (3) represents are tangent.

$$\theta s = \text{atan}(Scn/Sdn) + C1 \quad (3)$$

In Eq. (3), C1 is a constant representing an angle. For example, the constant C1 is 90°. The constant C1 may be adjusted according to such factors as the mounting precision of the detection signal generation unit 2.

If θs is in the range of 0° to less than 360°, θs in. Eq. (3) has two solutions 180° different in value. Which of the two solutions of θs in Eq. (3) is the true value of θs can be determined from the combination of positive and negative signs of Scn and Sdn. The computing unit 337 determines θs within the range of 0° to less than 360° on the basis of Eq. (3) and the foregoing determination on the combination of positive and negative signs of Scn and Sdn.

The condition determination apparatus 4 shown in FIG. 4 will now be described. The condition determination apparatus 4 includes a determination value generation unit 41 and a determination unit 42. The determination value generation unit 41 generates at least one determination value corresponding to the condition of the physical quantity information generation apparatus or the angle sensor 1. The determination unit 42 determines whether the physical quantity information generation apparatus or the angle sensor 1 is in a predetermined condition by determining whether the at least one determination value falls within a determination range. In the present embodiment, as previously mentioned, the predetermined condition is particularly a condition in which the physical quantity information generation apparatus or the angle sensor 1 has not failed. Hereinafter, the condition in which the physical quantity information generation apparatus or the angle sensor 1 has not failed will be referred to as normal condition.

When the physical quantity information generation apparatus, i.e., the angle sensor 1, is in the predetermined condition, the at least one determination value varies depending on the predetermined physical quantity, i.e., the angle θ to be detected. In such a case, the at least one determination value when the physical quantity information generation apparatus is in the predetermined condition can be said to contain an ideal value component and a variation component, the variation component varying depending on the predetermined physical quantity. The variation component of the at least one determination value will hereinafter be referred to as a determination-value variation component. In the present embodiment, in particular, the variation of the at least one determination value when the physical quantity information generation apparatus is in the predetermined condition results from the error components of the detection signals S11, S12 and S13 mentioned above.

The determination unit 42 defines at least one threshold value that represents at least one end of the determination range, and varies the at least one threshold value so as to bring the variation of the difference between the at least one threshold value and the at least one determination value depending on the predetermined physical quantity when the physical quantity information generation apparatus is in the predetermined condition into a narrower range than the range over which the at least one determination value varies depending on the predetermined physical quantity when the physical quantity information generation apparatus is in the predetermined condition.

In the present embodiment, in particular, the determination value generation unit 41 generates at least one determination value by performing an operation using the first to third detection signals S11, S12 and S13 received at the input ports P10, P20 and P30, respectively. The determination unit 42 varies the at least one threshold value by using at least one of the first to third detection signals S11, S12 and S13.

In the present embodiment, in particular, the determination value generation unit 41 generates one determination value VHS by performing an operation including determining the sum of the first to third detection signals S11, S12, and S13. The "operation including determining the sum of the first to third detection signals S11, S12 and S13" includes multiplying the determined sum of the detection signals S11, S12 and S13 by a predetermined coefficient for normalization or other purposes, or adding/subtracting a predetermined value to/from the determined sum of the detection signals S11, S12 and S13. The detection signals S11, S12 and S13 used in this operation include normalized ones. The determination value VHS is expressed by the following Eq. (4).

$$VHS = S11 + S12 + S13 \tag{4}$$

If each of the detection signals S11, S12 and S13 is composed only of the ideal component and the angle sensor 1 has not failed, the determination value VHS is composed only of the ideal value component. In the present embodiment, in particular, the ideal value component is of a constant value, which specifically is 0, regardless of the angle θ to be detected.

In the cases other than when each of the detection signals S11, S12 and S13 is composed only of the ideal component and the angle sensor 1 has not failed, the determination value VHS may differ from the value of the ideal value component. If the determination value VHS differs from the value of the ideal value component, the determination value VHS can vary depending on the angle θ to be detected.

In particular, if each of the detection signals S11, S12 and S13 contains an error component, the determination value VHS varies depending on the angle θ to be detected when the angle sensor 1 is in the predetermined condition, i.e., normal condition. The variation of the determination value VHS results from the error components of the detection signals S11, S12 and S13.

In the present embodiment, in particular, the determination unit 42 defines a first threshold value TH1 and a second threshold value TH2. The first threshold value TH1 represents the lower end of the determination range, and the second threshold value TH2 represents the upper end of the determination range. The determination range thus extends from the first threshold value TH1 to the second threshold value TH2.

Hereinafter, the breadth of the range over which the determination value VHS varies depending on the angle θ to be detected when the angle sensor 1 is in the predetermined condition will be referred to as a determination-value variation range. The determination-value variation range is the difference between a maximum value and a minimum value of the determination value VHS when the angle sensor 1 is in the predetermined condition.

The difference between the first threshold value TH1 and the determination value VHS when the angle sensor 1 is in the predetermined condition will be referred to as a first gap. The breadth of the range over which the first gap varies depending on the angle θ to be detected will be referred to as a first gap variation range. The first gap variation range is the difference between a maximum value and a minimum value of the first gap.

The difference between the second threshold value TH2 and the determination value VHS when the angle sensor 1 is in the predetermined condition will be referred to as a second gap. The breadth of the range over which the second gap varies depending on the angle θ to be detected will be referred to as a second gap variation range. The second gap variation range is the difference between a maximum value and a minimum value of the second gap.

The determination unit 42 varies the first and second threshold values TH1 and TH2 so as to make the first and second gap variation ranges smaller than the determination-value variation range.

Now, the first and second threshold values TH1 and TH2 will be specifically described. The first and second threshold values TH1 and TH2 are expressed by the following Eqs. (5) and (6), respectively.

$$TH1 = SV1 + FC \tag{5}$$

$$TH2 = SV2 + FC \tag{6}$$

SV1 is a first reference value, and SV2 is a second reference value. Both the first and second reference values SV1 and SV2 are constant values. The second reference value SV2 is larger than the first reference value SV1. FC is a variation component of each threshold value, which will hereinafter be referred to as a threshold-value variation component. The threshold-value variation component FC varies depending on the angle θ to be detected. The threshold-value variation component FC is generated by using at least one of the first to third detection signals S11, S12 and S13. In this way, the determination unit 42 varies the first and second threshold values TH1 and TH2 by using at least one of the first to third detection signals S11, S12 and S13.

Now, first and second examples of the threshold-value variation component FC will be described. The first example of the threshold-value variation component FC is expressed by the following Eq. (7). In Eq. (7), "a", "b", and "n" are coefficients.

$$FC = (-3a/n) \cdot S12 + (4a/n^3) \cdot S12^3 + b \tag{7}$$

The meaning of the first example of the threshold-value variation component FC will be described. One of the main causes of the determination-value variation component contained in the determination value VHS when the angle sensor 1 is in the normal condition is that the detection signals S11, S12 and S13 contain the respective third harmonic error components. If none of the detection signals S11, S12 and S13 contains the first-order error component, the third harmonic error components of the detection signals S11, S12 and S13 are in phase with each other. If the determination value VHS is generated by Eq. (4), the resulting determination value VHS contains a determination-value variation component yielded by adding up the third harmonic error components of the detection signals S11, S12 and S13. Such a determination-value variation component will hereinafter be referred to as the third-order variation component. The third-order variation component has a period of ⅓ that of the ideal components of the detection signals S11, S12, and S13.

If none of the detection signals S11, S12 and S13 contains the first-order error component, the third-order variation component is in phase with the third harmonic error components of the detection signals S11, S12 and S13, and the breadth of the range of variation of the third-order variation component is the sum of the breadths of the ranges of variation of the third harmonic error components of the detection signals S11, S12 and S13. The determination value VHS generated when the angle sensor 1 is in the normal condition varies depending on the angle θ to be detected, mainly because of the third-order variation component contained therein.

The first example of the threshold-value variation component FC is an approximate value of the third-order variation component. The first example of the threshold-value variation component FC is derived in the following manner. The third-order variation component can be expressed as $a \cdot \cos(3\theta)+b$. This can be transformed into $a \cdot (-3 \cdot \cos \theta + 4 \cdot \cos^3 \theta)+b$. Here, $\cos \theta$ corresponds to a signal obtained by normalizing the ideal component of the second detection signal S12 to have a maximum value of 1 and a minimum value of $-1$. A difference between the second detection signal S12 itself and the ideal component of the second detection signal S12 is small. A signal obtained by normalizing the second detection signal S12 to have a maximum value of 1 and a minimum value of $-1$ will be denoted as S12/n. Then, $\cos \theta$ can be approximated as S12/n. In such a case, the third-order variation component can be approximated as $a \cdot \{-3 \cdot (S12/n) + 4 \cdot (S12/n)^3\}+b$. Its transformation yields the right-handed side of Eq. (7). The threshold-value variation component FC expressed by Eq. (7) can thus be said to be an approximate value of the third-order variation component. The values of the coefficients "a" and "b" in Eq. (7) are determined, for example, according to the result of a measurement of the determination value VHS performed before shipment of the non-failed angle sensor 1. The coefficient "n" is determined in advance.

The third-order variation component is extremely smaller in amplitude than the ideal components of the detection signals S11, S12 and S13. Thus, the value of the coefficient "a" in Eq. (7) is also extremely smaller than the amplitude of the ideal component of each of the detection signals S11, S12 and S13. More specifically, the value of the coefficient "a" in Eq. (7) is 10% or less of the amplitude of the ideal component of each of the detection signals S11, S12 and S13.

If at least one of the detection signals S11, S12, and S13 contains the first-order error component, the third harmonic error components of the detection signals S11, S12 and S13 and the third-order variation component are not perfectly in phase with each other. The second example of the threshold-value variation component FC is intended to accommodate such a situation.

The second example of the threshold-value variation component FC is expressed by the following Eq. (8). In Eq. (8), "a", "b", "c", and "n" are coefficients, $$FC = (-3a/n) \cdot S12 + (4a/n^3) \cdot S12^3 + (-3c/n) \cdot S11 + (4c/n^3) \cdot S11^3 + b \qquad (8)$$

The second example of the threshold-value variation component FC contains the two detection signals S11 and S12. Thus, when employing the second example of the threshold-value variation component FC, the determination unit 42 uses the two detection signals S11 and S12 to vary the first and second threshold values TH1 and TH2.

The values of the coefficients "a" and "c" can be adjusted to change the phase of the second example of the threshold-value variation component FC. This enables setting the threshold-value variation component FC approximating the third-order variation component even when the third harmonic error components of the detection signals S11, S12 and S13 and the third-order variation component are not perfectly in phase with each other. The values of the coefficients "a", "b" and "c" in Eq. (8) are determined, for example, according to the result of a measurement of the determination value VHS performed before shipment of the non-failed angle sensor 1. The coefficient "n" is determined in advance. Like the coefficient "a", the value of the coefficient "c" is extremely smaller than the amplitude of the ideal component of each of the detection signals S11, S12 and S13. More specifically, the value of the coefficient "c" is 10% or less of the amplitude of the ideal component of each of the detection signals S11, S12 and S13.

When the determination value VHS contains the third-order variation component, varying the first and second threshold values and TH1 and TH2 using the first or second example of the threshold-value variation component FC causes the first and second gap variation ranges to be much smaller than the determination-value variation range.

The determination unit 42 determines that the angle sensor 1 is in the normal condition if the determination value VHS falls within the determination range. In other cases, the determination unit 42 determines that the angle sensor 1 has failed. The determination unit 42 outputs a signal indicating the determination result. The first and second reference values SV1 and SV2 define the extent of the determination range. A method for determining the reference values SV1 and SV2 will be described in detail later.

Figure 8:
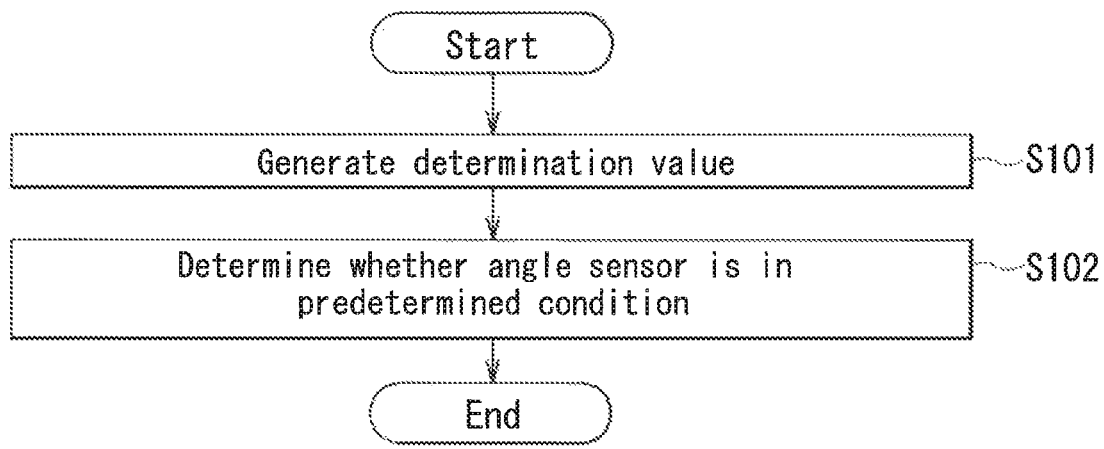
FIG. 8 is a flowchart illustrating a method for determining the condition of the angle sensor according to the first embodiment of the invention.

Reference is now made to FIG. 8 to describe a condition determination method according to the present embodiment. The condition determination method according to the present embodiment is a method for determining the condition of a physical quantity information generation apparatus or the angle sensor 1. In the present embodiment, the condition determination method is particularly a method for determining whether the angle sensor 1 is in a predetermined condition or the normal condition. The condition determination method is performed by the condition determination apparatus 4 according to the present embodiment.

As shown in FIG. 8, the condition determination method according to the present embodiment includes: step S101 of generating the determination value VHS by performing an operation using the detection signals S11, S12 and S13; and step S102 of determining whether the angle sensor 1 is in a predetermined condition by determining whether the determination value VHS falls within the determination range.

Step S101 is performed by the determination value generation unit 41 shown in FIG. 4. The details of step S101 are the same as the details of the operation of the determination value generation unit 41 described previously. Step S102 is performed by the determination unit 42 shown in FIG. 4. The details of step S102 are the same as the details of the operation of the determination unit 42 described previously.

Figure 9:
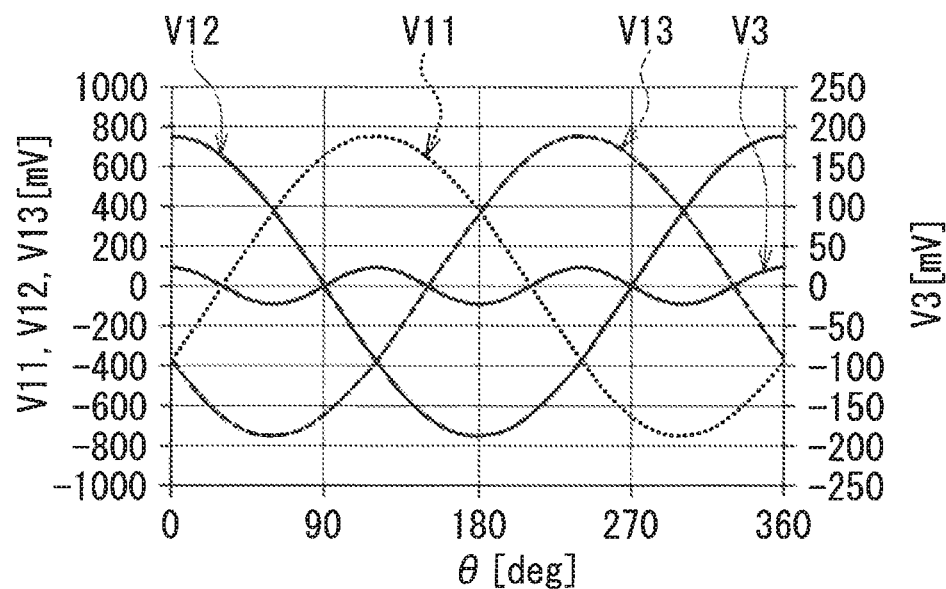
FIG. 9 is a waveform diagram illustrating the waveforms of ideal components and third harmonic error components of first to third detection signals used in a simulation.

Now, the effects of the angle sensor 1 according to the present embodiment and an example of the method for determining the first and second reference values SV1 and SV2 will be described with reference to the results of a simulation. FIG. 9 is a waveform diagram illustrating the waveforms of the ideal components and the third harmonic error components of the first to third detection signals S11, S12 and S13 used in the simulation. In FIG. 9, the ideal components of the detection signals S11, S12 and S13 are represented by the symbols V11, V12 and V13, respectively. In FIG. 9, the third harmonic error components of the detection signals S11, S12 and S13 are identical in waveform. In FIG. 9, the third harmonic error components of the detection signals S11, S12 and S13 are represented by the symbol V3. In FIG. 9, the horizontal axis represents the angle θ to be detected, and the vertical axes represent the ideal components V11, V12 and V13 and the third harmonic error component V3.

Figure 10:
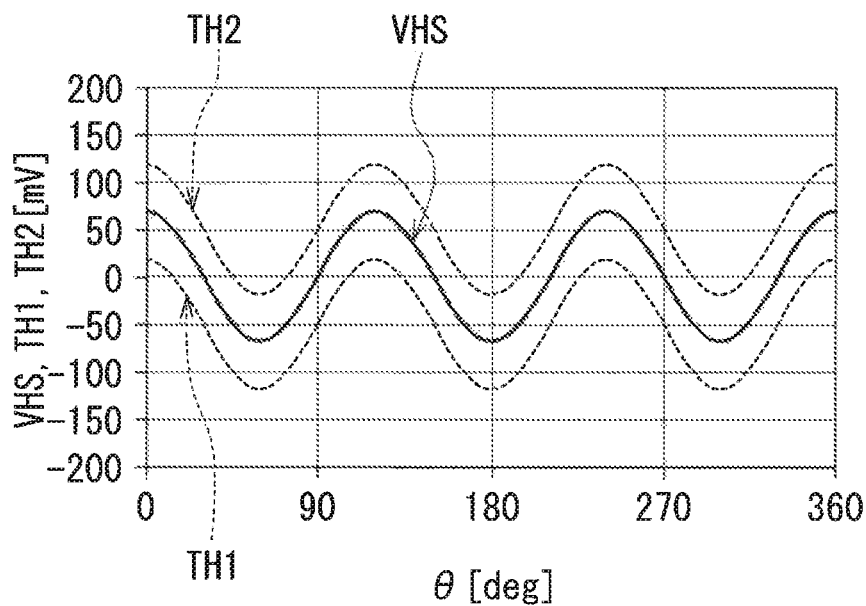
FIG. 10 is a waveform diagram illustrating the waveforms of a determination value and first and second threshold values in a normal condition.

The simulation first examined the waveforms of the determination value VHS and the first and second threshold values TH1 and TH2 when the angle sensor 1 was in the normal condition. FIG. 10 shows the waveforms. In FIG. 10, the horizontal axis represents the angle θ to be detected, and the vertical axis represents the determination value VHS and the first and second threshold values TH1 and TH2. The first and second threshold values TH1 and TH2 shown in FIG. 10 were generated from Eqs. (5) and (6) using the first example of the threshold-value variation component FC. In the example shown in FIG. 10, the first reference value SV1 is −50 mV, and the second reference value SV2 is 50 mV.

The determination value VHS contains the third-order variation component. Thus, as shown in FIG. 10, the determination value VHS varies depending on the angle θ to be detected even if the angle sensor 1 is in the normal condition. Each of the first and second threshold values TH1 and TH2 contains the threshold-value variation component FC of a value approximating the third-order variation component. The first and second threshold values TH1 and TH2 thus vary depending on the angle θ to be detected in a manner similar to that in which the determination value VHS varies. The first gap, which is the difference between the first threshold value TH1 and the determination value VHS, is approximately 50 mV regardless of the angle θ to be detected. Likewise, the second gap, which is the difference between the second threshold value TH2 and the determination value VHS, is approximately 50 mV regardless of the angle θ to be detected. Thus, each of the first and second gap variation ranges is approximately zero. The first and second gap variation ranges are thus much smaller than the determination-value variation range.

Now, an angle sensor of a first comparative example will be described. The angle sensor of the first comparative example includes a determination unit of the first comparative example, instead of the determination unit 42, to determine whether the angle sensor is in a predetermined condition. In the first comparative example, the determination unit defines a determination range of the first comparative example. The determination range of the first comparative example has invariable two threshold values representing both ends of the range.

The angle sensor of the first comparative example has the following problem. First, assume that the determination range of the first comparative example extends from −50 mV, i.e., the first reference value SV1, to 50 mV, i.e., the second reference value SV2, in the example shown in FIG. 10. In this case, as is apparent from FIG. 10, even if the angle sensor is in the normal condition, the determination value VHS can exceed the determination range of the first comparative example depending on the angle θ to be detected, and the angle sensor can thus be determined to have failed.

For the angle sensor of the first comparative example, to prevent a situation in which the angle sensor is determined to have failed even though the angle sensor is in the normal condition, the determination range of the first comparative example needs to be set to a range that includes and is wider than the variation range of the determination value VHS when the angle sensor is in the normal condition. However, if the determination range of the first comparative example is set to such a range, the determination value VHS does not always exceed the determination range of the first comparative example at the instant when the angle sensor fails actually, because the determination-value variation range is large. In addition, even if the angle θ to be detected continues to change after the angle sensor has failed actually, the condition in which the determination value VHS does not exceed the determination range of the first comparative example can last a while. Further, in some modes of failure, the condition in which the determination value VHS does not exceed the determination range of the first comparative example can last for indefinitely long periods of time even if the angle θ to be detected continues to change after the angle sensor has failed actually. Thus, the angle sensor of the first comparative example is not capable of accurately detecting a failure of the angle sensor.

In contrast to this, according to the present embodiment, the first and second gap variation ranges are much smaller than the determination-value variation range as described above. As a result, the present embodiment achieves reduction of the first and second gaps while preventing a situation in which the angle sensor 1 is determined to have failed even in the normal condition. This enables the determination value VHS to exceed the determination range at the instant when the angle sensor 1 fails actually. Consequently, the present embodiment enables accurate determination of the condition of the angle sensor 1, i.e., whether the angle sensor 1 has failed.

The predetermined condition of the angle sensor 1 of the present embodiment may be other than the normal condition and may be any condition under which the determination value VHS varies depending on the angle θ to be detected. In such a case also, it is possible to determine whether the angle sensor 1 is in the predetermined condition with high accuracy by varying the first and second threshold values TH1 and TH2 so as to make the first and second gap variation ranges smaller than the determination-value variation range when the angle sensor 1 is in the predetermined condition.

Figure 11:
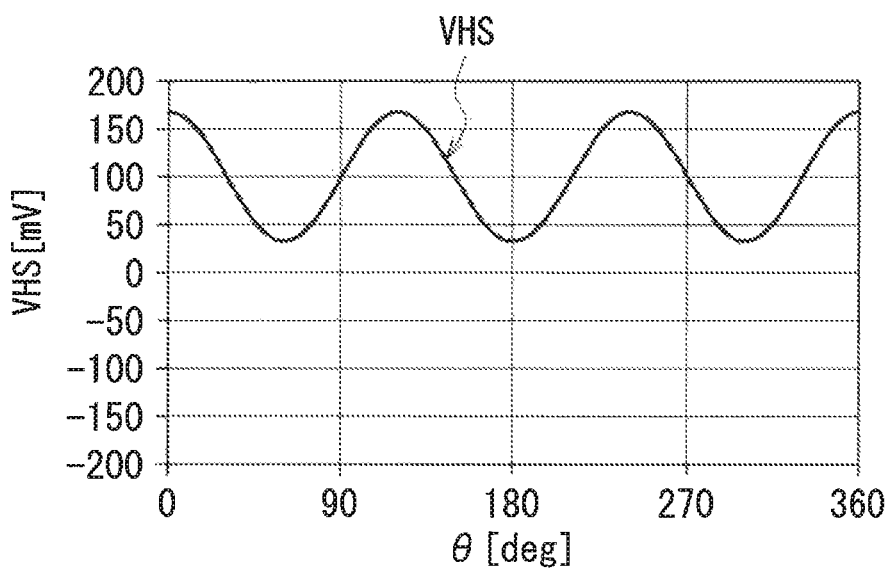
FIG. 11 is a waveform diagram illustrating the waveform of the determination value in a simulated failed condition.

An example of the method for determining the first and second reference values SV1 and SV2 will now be described. First, a description will be given of a technique to be used in the method. In the simulation, a signal obtained by adding an offset value to the normal detection signal S11 was input to the input port P10 shown in FIG. 4, whereby the angle sensor 1 was brought into a condition simulating a failure. Such a condition will hereinafter be referred to as a simulated failed condition. FIG. 11 shows the waveform of the determination value VHS when the offset value is 100 mV. In FIG. 11, the horizontal axis represents the angle θ to be detected, and the vertical axis represents the determination value VHS.

Figure 12:
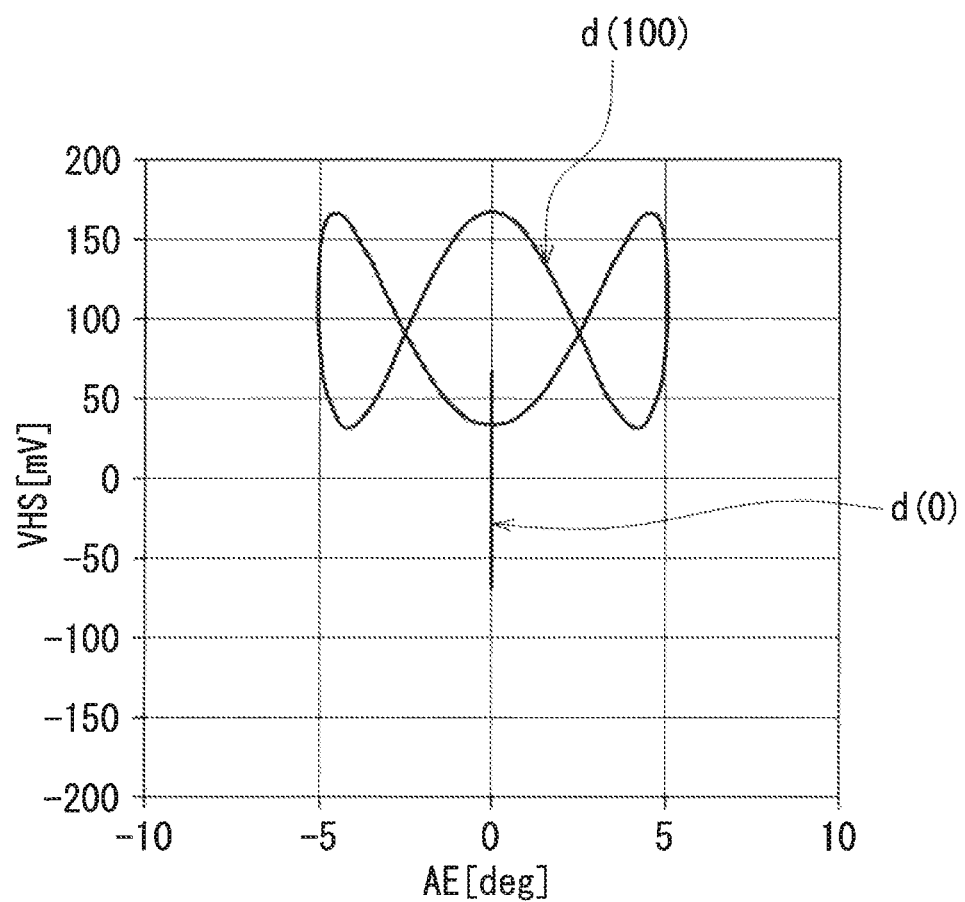
FIG. 12 is a waveform diagram showing initial relationship graphs in the normal condition and the simulated failed condition.

An error occurring in the detected angle value θs will be referred to as angular error, which will be denoted by the symbol AE. In the event of a failure of the angle sensor 1, the angular error AE may exceed an allowable range. In the simulation, a relationship between the angular error AE and the determination value VHS while the angle θ to be detected changed from 0° to 360° was plotted on a graph in each of the normal condition and the simulated failed condition. In the following description, such a graph will be referred to as initial relationship graph. FIG. 12 shows the initial relationship graphs in the normal condition and the simulated failed condition. In FIG. 12, the horizontal axis represents the angular error AE, and the vertical axis represents the determination value VHS. In FIG. 12, the straight line denoted by the symbol d(0) represents the initial relationship graph in the normal condition, and the curve denoted by the symbol d(100) represents the initial relationship graph in the simulated failed condition when the offset value is 100 mV.

A determination value VHS falling within the determination range is represented by the the following expression (9).

$$TH1 \leq VHS \leq TH2 \tag{9}$$

Modifying the expression (9) using Eqs. (5) and (6) gives the following expression (10).

$$SV1+FC \leq VHS \leq SV2+FC \tag{10}$$

Here, a corrected determination value VHSC is defined as Eq. (11) below.

$$VHSC = VHS - FC \tag{11}$$

The following expression (12) is yielded from the expression (10) and Eq. (11).

$$SV1 \leq VHSC \leq SV2 \tag{12}$$

It is apparent from the expression (12) that finding out a variation range of the corrected determination value VHSC when the angular error AR is within the allowable range in the normal condition allows the first and second reference values SV1 and SV2 to be determined.

Figure 13:
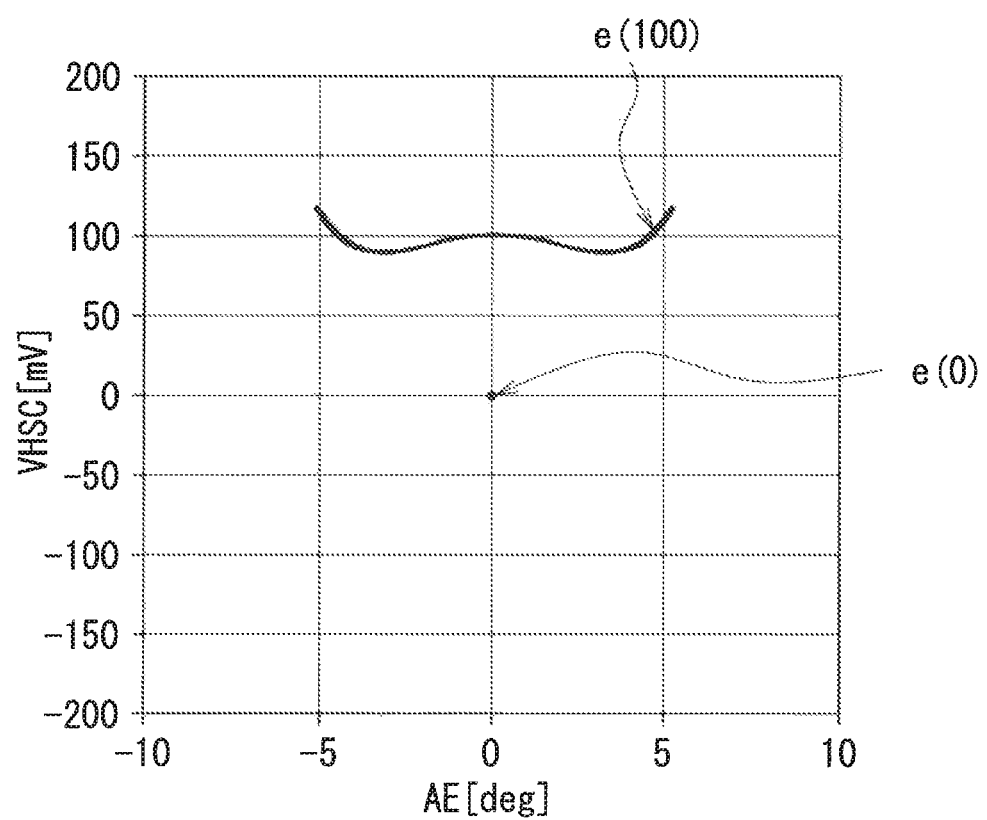
FIG. 13 is a waveform diagram showing corrected relationship graphs in the normal condition and the simulated failed condition.

In the simulation, a relationship between the angular error AE and the corrected determination value VHSC while the angle θ to be detected changed 0° to 360° was plotted on a graph in each of the normal condition and the simulated failed condition. In the following description, such a graph will be referred to as corrected relationship graph. FIG. 13 shows corrected relationship graphs in the normal condition and in the simulated failed condition with the offset value set at 100 mV. In FIG. 13, the horizontal axis represents the angular error AE, and the vertical axis represents the corrected determination value VHSC. In FIG. 13, the point denoted by the symbol e(0) represents the corrected relationship graph in the normal condition, and the curve denoted by the symbol e(100) represents the corrected relationship graph in the simulated failed condition with the offset value set at 100 mV.

Now, a description will be given of modes of failure of the angle sensor 1. Possible failures of the angle sensor 1 include one caused by a failure of at least one of the detection circuits 10, 20 and 30. Failures of a detection circuit include one resulting from a short circuit of at least one of the plurality of MR elements 50 included in the detection circuit, and one resulting from a disconnection of at least either one of the upper and lower electrodes 63 and 62. If at least one of the detection circuits 10, 20 and 30 has failed, at least one of the detection signals S11, S12 and S13 becomes different from that in normal times. If such a failure of the angle sensor 1 occurs, the angular error AE becomes greater than that in normal times and the corrected determination value VHSC becomes different from that in normal times. Possible causes of the angular error AE include ones ascribable to the failure of the angle sensor 1 and ones not ascribable to the failure of the angle sensor 1.

The first and second reference values SV1 and SV2 are determined by the following method so as to detect such a failure of the angle sensor 1 that the angular error AE exceeds an allowable range. In the method, first, a relationship between the maximum absolute value of the angular error AE and the maximum absolute value of the corrected determination value VHSC is determined by simulation or experiment. The relationship can be determined through the following first and second steps.

In the first step, a signal obtained by adding an offset value to the normal detection signal S11 to simulate a failure of the angle sensor 1 is input to the input port P10 shown in FIG. 4. The normal detection signals S12 and S13 are input to the input ports P20 and P30, respectively. Then, a corrected relationship graph representing the relationship between the angular error AE and the corrected determination value VHSC while the angle θ to be detected changes from 0° to 360° is drawn. In the first step, such an operation is performed a plurality of times with different offset values. A plurality of corrected relationship graphs corresponding to a plurality of offset values are thereby obtained.

Figure 14:
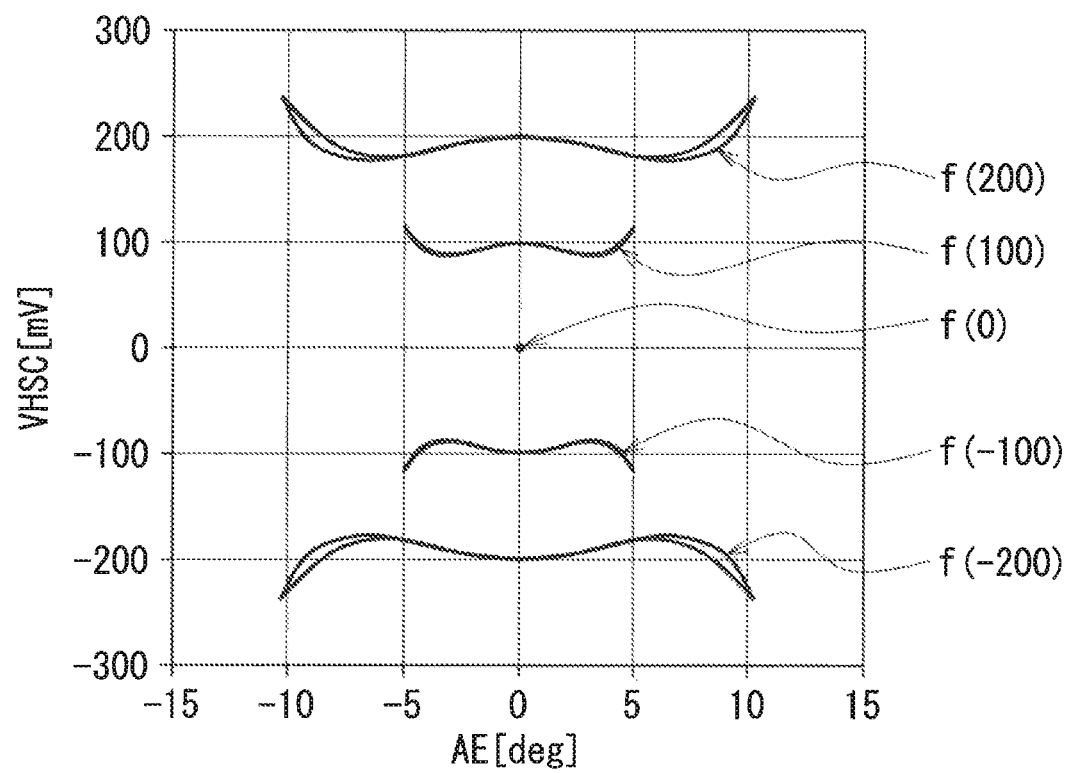
FIG. 14 is a waveform diagram showing a plurality of corrected relationship graphs corresponding to a plurality of offset values.
Figure 15:
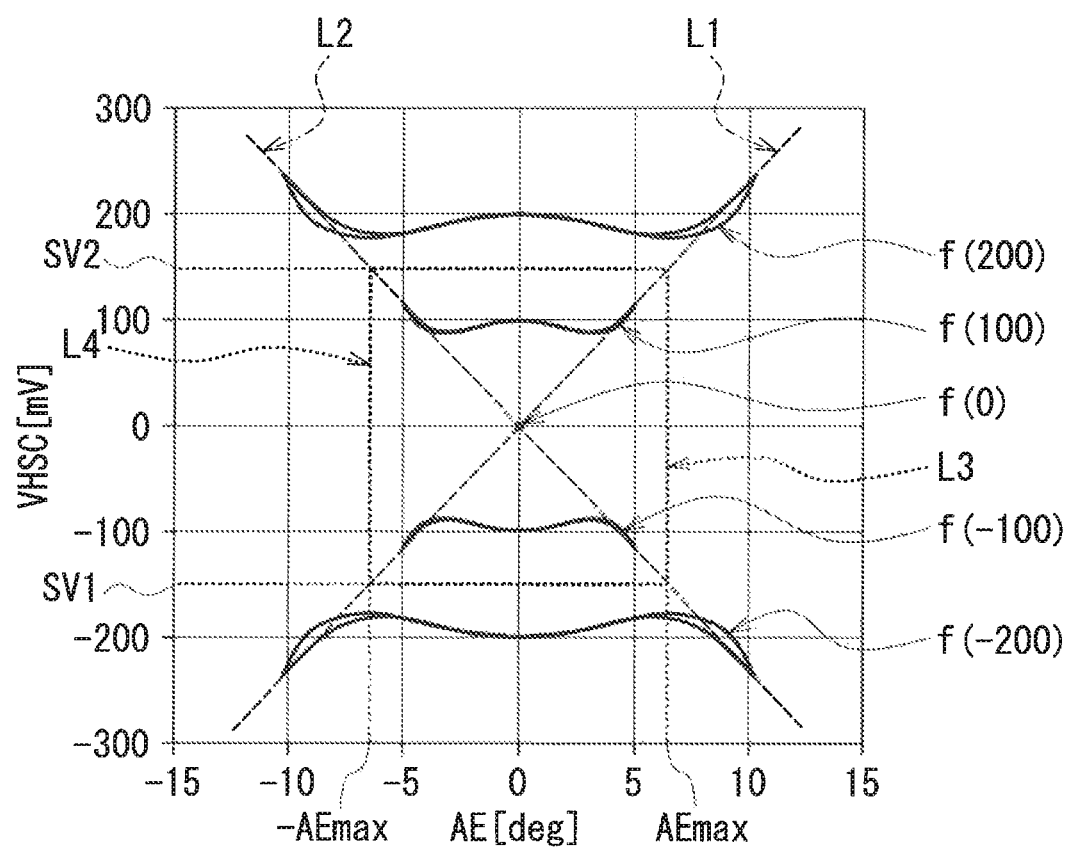
FIG. 15 is an explanatory diagram for explaining a method for determining first and second reference values using the plurality of corrected relationship graphs shown in FIG. 14.

FIGS. 14 and 15 show examples of the plurality of corrected relationship graphs obtained through the first step. In FIGS. 14 and 15, the horizontal axis represents the angular error AE, and the vertical axis represents the corrected determination value VHSC. The curve denoted by the symbol f(−200) represents the corrected relationship graph when the offset value is −200 mV. The curve denoted by the symbol f(−100) represents the corrected relationship graph when the offset value is −100 mV. The curve denoted by the symbol f(100) represents the corrected relationship graph when the offset value is 100 mV. The curve denoted by the symbol f(200) represents the corrected relationship graph when the offset value is 200 mV. The point denoted by the symbol f(0) represents the corrected relationship graph when the offset value is 0.

In the second step, the relationship between the maximum absolute value of the angular error AE and the maximum absolute value of corrected determination value VHSC is determined in the following manner by using the plurality of corrected relationship graphs obtained through the first step. In the following description, a point representing a combination of any given value AEn of the angular error AE and any given value VHSCn of the corrected determination value VHSC in FIGS. 14 and 15 will be denoted as (AEn, VHSCn).

In the second step, first, a maximum absolute value AEm of the angular error AE and a maximum absolute value VHSCm of the corrected determination value VHSC are determined for each of the plurality of corrected relationship graphs except the corrected relationship graph when the offset value is 0. For the corrected relationship graphs with negative offset values, assume a point (−AEm, −VHSCm) as a first point and a point (AEm, −VHSCm) as a second point. For the corrected relationship graphs with positive offset values, assume a point (AEm, VHSCm) as a first point and a point (−AEm, VHSCm) as a second point.

Next, as shown in FIG. 15, a straight line or a polygonal line close to a straight line that links a plurality of first points corresponding to the plurality of corrected relationship graphs is drawn. Such a straight line or polygonal line will be referred to as the first line and denoted by the symbol L1. Further, a straight line or a polygonal line close to a straight line that links a plurality of second points corresponding to the plurality of corrected relationship graphs is drawn. Such a straight line or polygonal line will be referred to as the second line and denoted by the symbol L2. The first and second lines L1 and L2 represent the relationship between the maximum absolute value of the corrected determination value VHSC and the maximum absolute value of the angular error AE.

Next, the first and second reference values SV1 and SV2 are determined using the first line L1 and the second line L2 in the following manner. Initially, a maximum absolute value AEmax of an allowable angular error AE is determined. In FIG. 15, AEmax is set to 7° by way of example. Next, in FIG. 15, a third line L3 representing AEmax and a fourth line L4 representing −AEmax are drawn. The range of the angular error AE between the third line L3 and the fourth line L4 represents the allowable range of the angular error AE. Then, the value of the corrected determination value VHSC at the intersection of the third line L3 and the second line L2 is assumed as SV1m, and the value of the corrected determination value VHSC at the intersection of the third line L3 and the first line L1 is assumed as SV2m.

If the corrected determination value VHSC falls within the range from SV1m to SV2m, then the angular error AE falls within the allowable range of the angular error AE. Thus, to set the largest determination range, the first reference value SV1 is set at SV1m, and the second reference value SV2 is set at SV2m. To narrow the determination range, the first reference value SV1 may be set at a value that is larger than SV1m and smaller than 0, and the second reference value SV2 may be set at a value that is larger than 0 and smaller than SV2m.

Suppose that the threshold-value variation component FC expressed by Eq. (7) is employed and there occurs such a failure of the angle sensor 1 that the detection signal S12 changes from that in the normal condition. In such a case, the threshold-value variation component FC changes from that in the normal condition. However, the value of the coefficient "a" in Eq. (7) is significantly smaller than the amplitude of the ideal component of the detection signal S12. Thus, in the event of such a failure of the angle sensor 1 that the detection signal S12 changes from that in the normal condition, the amount of change of the threshold-value variation component FC is extremely smaller than that of the determination value VHS. It is thus possible to accurately detect the failure of the angle sensor 1 by using the determination range defined by the first and second threshold values TH1 and TH2 even in the event of the aforementioned failure.

Also, suppose that the threshold-value variation component FC expressed by Eq. (8) is employed and there occurs such a failure of the angle sensor 1 that the detection signal S11 or S12 changes from that in the normal condition. In such a case, the threshold-value variation component FC changes from that in the normal condition. However, the values of the coefficients "a" and "c" in Eq. (8) are significantly smaller than the amplitudes of the ideal components of the detection signals S11 and S12. Thus, in the event of such a failure of the angle sensor 1 that the detection signal S11 or S12 changes from that in the normal condition, the amount of change of the threshold-value variation component FC is extremely smaller than that of the determination value VHS. It is thus possible to accurately detect the failure of the angle sensor 1 by using the determination range defined by the first and second threshold values TH1 and TH2 even in the event of the aforementioned failure.

The effects of the angle sensor 1 according to the present embodiment other than those resulting from the condition determination apparatus 4 will now be described. In the angle sensor 1 according to the present embodiment, the detection signal generation unit 2 generates the detection signals S11, S12 and S13 of which the ideal components are different in phase from each other by 120°. In the angle detection unit 3, the computing unit 31 generates the signal Sa indicative of the difference between the detection signals S11 and S12, and the computing unit 32 generates the signal Sb indicative of the difference between the detection signals S13 and S12. When the signal Sa is generated by the computing unit 31, the third harmonic error component of the detection signal S11 and that of the detection signal S12 cancel each other out. When the signal Sb is generated by the computing unit 32, the third harmonic error component of the detection signal S13 and that of the detection signal S12 cancel each other out. The angle computing unit 33 performs an operation using the signals Sa and Sb to generate the detected angle value θs. The present embodiment thus enables generation of the detected angle value θs that achieves a reduction in the error resulting from the third harmonic error components of the detection signals S11, S12 and S13.

Second Embodiment

A second embodiment of the invention will now be described. The angle sensor 1 according to the second embodiment includes a detection signal generation unit 102, an angle detection unit 103 and a condition determination apparatus 104, in place of the detection signal generation unit 2, the angle detection unit 3 and the condition determination apparatus 4 of the first embodiment. The detection signal generation unit 102 and the angle detection unit 103 correspond to the physical quantity information generation unit.

Figure 16:
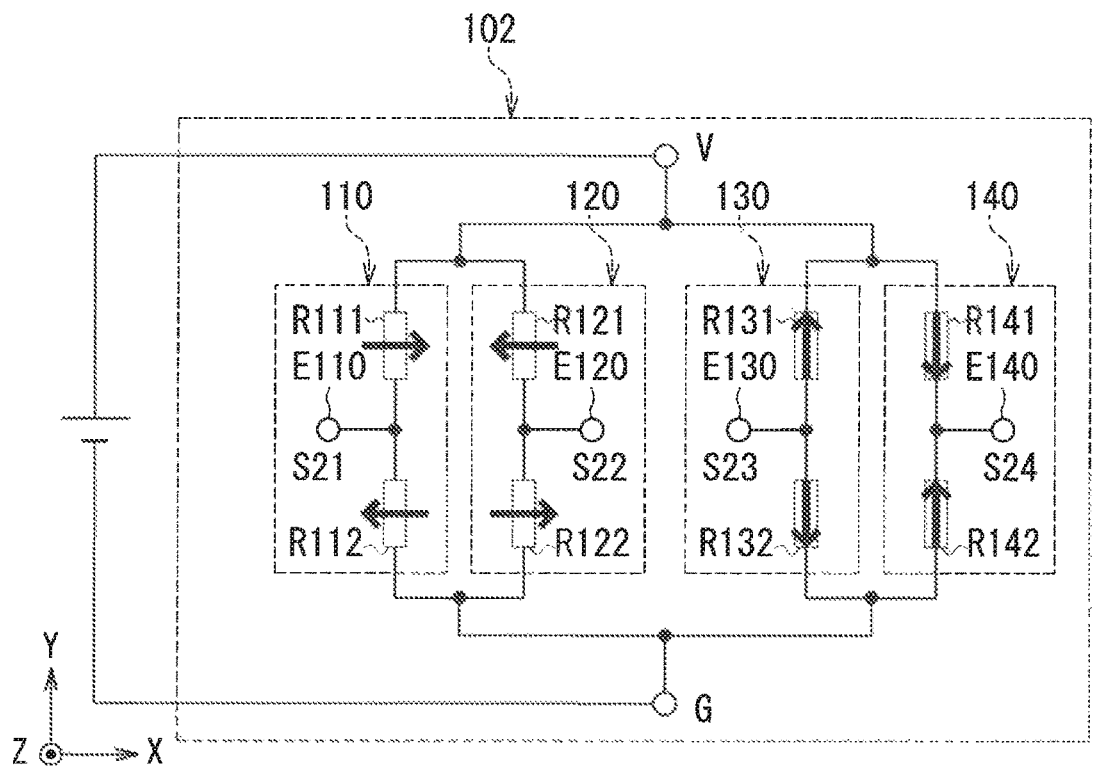
FIG. 16 is a circuit diagram illustrating the configuration of a detection signal generation unit of an angle sensor according to a second embodiment of the invention.

First, the detection signal generation unit 102 will be described with reference to FIG. 16. FIG. 16 is a circuit diagram illustrating the configuration of the detection signal generation unit 102. The detection signal generation unit 102 generates a first, a second, a third and a fourth detection signal S21, S22, S23 and S24 each having a correspondence with the angle θ to be detected. The detection signal generation unit 102 includes a first detection circuit 110 for generating the first detection signal S21, a second detection circuit 120 for generating the second detection signal S22, a third detection circuit 130 for generating the third detection signal S23, and a fourth detection circuit S140 for generating the fourth detection signal S24. Each of the first to fourth detection circuits 110, 120, 130 and 140 includes at least one magnetic detection element for detecting the rotating magnetic field MF. The detection signal generation unit 102 further includes a power supply port V and a ground port G. A power supply voltage of predetermined magnitude, such as 5 volts, is applied between the power supply port V and the ground port G.

As the direction DM of the rotating magnetic field MF rotates with a predetermined period, the angle θ to be detected varies with the predetermined period. In such a case, all the first to fourth detection signals S21, S22, S23 and S24 vary periodically with a signal period equal to the predetermined period. The first to fourth detection signals S21, S22, S23 and S24 are different in phase from each other.

The first detection circuit 110 includes a pair of serially connected magnetic detection elements R111 and R112, and an output port E110. One end of the magnetic detection element R111 is connected to the power supply port V. The other end of the magnetic detection element R111 is connected to one end of the magnetic detection element R112 and the output port E110. The other end of the magnetic detection element R112 is connected to the ground port G. The output port E110 outputs the first detection signal S21 which corresponds to the potential at the connection point between the magnetic detection elements R111 and R112.

The second detection circuit 120 includes a pair of serially connected magnetic detection elements R121 and R122, and an output port E120. One end of the magnetic detection element R121 is connected to the power supply port V. The other end of the magnetic detection element R121 is connected to one end of the magnetic detection element R122 and the output port E120. The other end of the magnetic detection element R122 is connected to the ground port G. The output port E120 outputs the second detection signal S22 which corresponds to the potential at the connection point between the magnetic detection elements R121 and R122.

The third detection circuit 130 includes a pair of serially connected magnetic detection elements R131 and 8132, and an output port E130. One end of the magnetic detection element R131 is connected to the power supply port V. The other end of the magnetic detection element R131 is connected to one end of the magnetic detection element R132 and the output port E130. The other end of the magnetic detection element R132 is connected to the ground port G. The output port E130 outputs the third detection signal S23 which corresponds to the potential at the connection point between the magnetic detection elements R131 and R132.

The fourth detection circuit 140 includes a pair of serially connected magnetic detection elements R141 and R142, and an output port E140. One end of the magnetic detection element R141 is connected to the power supply port V. The other end of the magnetic detection element R141 is connected to one end of the magnetic detection element R142 and the output port E140. The other end of the magnetic detection element R142 is connected to the ground port G. The output port E140 outputs the fourth detection signal S24 which corresponds to the potential at the connection point between the magnetic detection elements R141 and R142.

The magnetic detection elements R111, R112, R121, R122, R131, R132, R141 and R142 are configured in the same manner as the magnetic detection elements R11, R12, R21, R22, R31 and R32 of the first embodiment except for the magnetization directions of the magnetization pinned layers.

In the first detection circuit 110, the magnetization pinned layers of the MR elements included in the magnetic detection element R111 are magnetized in the X direction. This magnetization direction will hereinafter be referred to as the first direction D11. The magnetization pinned layers of the MR elements included in the magnetic detection element R112 are magnetized in the opposite direction to the first direction D11, that is, in the −X direction. In the first detection circuit 110, the potential at the connection point between the magnetic detection elements R111 and R112 varies depending on the strength of a component in the first direction D11 of the rotating magnetic field MF. Thus, the first detection circuit 110 detects the strength of the component in the first direction D11 of the rotating magnetic field MF and generates a signal indicative of the strength as the first detection signal S21. The strength of the component in the first direction D11 of the rotating magnetic field MF has a correspondence with the angle θ to be detected.

In the second detection circuit 120, the magnetization pinned layers of the MR elements included in the magnetic detection element R121 are magnetized in the −X direction. This magnetization direction will hereinafter be referred to as the second direction D12. The magnetization pinned layers of the MR elements included in the magnetic detection element R122 are magnetized in the opposite direction to the second direction D12, that is, in the X direction. In the second detection circuit 120, the potential at the connection point between the magnetic detection elements R121 and R122 varies depending on the strength of a component in the second direction D12 of the rotating magnetic field MF. Thus, the second detection circuit 120 detects the strength of the component in the second direction D12 of the rotating magnetic field MF and generates a signal indicative of the strength as the second detection signal S22. The strength of the component in the second direction D12 of the rotating magnetic field MF has a correspondence with the angle θ to be detected.

In the third detection circuit 130, the magnetization pinned layers of the MR elements included in the magnetic detection element R131 are magnetized in the Y direction. This magnetization direction will hereinafter be referred to as the third direction D13. The magnetization pinned layers of the MR elements included in the magnetic detection element R132 are magnetized in the opposite direction to the third direction D13, that is, in the −Y direction. In the third detection circuit 130, the potential at the connection point between the magnetic detection elements R131 and R132 varies depending on the strength of a component in the third direction D13 of the rotating magnetic field MF. Thus, the third detection circuit 130 detects the strength of the component in the third direction D13 of the rotating magnetic field MF and generates a signal indicative of the strength as the third detection signal S23. The strength of the component in the third direction D13 of the rotating magnetic field MF has a correspondence with the angle θ to be detected.

In the fourth detection circuit 140, the magnetization pinned layers of the MR elements included in the magnetic detection element R141 are magnetized in the −Y direction. This magnetization direction will hereinafter be referred to as the fourth direction D14. The magnetization pinned layers of the MR elements included in the magnetic detection element R142 are magnetized in the opposite direction to the fourth direction D14, that is, in the Y direction. In the fourth detection circuit 140, the potential at the connection point between the magnetic detection elements R141 and R142 varies depending on the strength of a component in the fourth direction D14 of the rotating magnetic field MF. Thus, the fourth detection circuit 140 detects the strength of the component in the fourth direction D14 of the rotating magnetic field MF and generates a signal indicative of the strength as the fourth detection signal S24. The strength of the component in the fourth direction D14 of the rotating magnetic field MF has a correspondence with the angle θ to be detected.

In the light of the production accuracy of the MR elements or other factors, the magnetization directions of the magnetization pinned layers of the plurality of MR elements in the detection circuits 110, 120, 130 and 140 may be slightly different from those described above.

When the angle θ to be detected varies with the predetermined period, each of the detection signals S21, S22, S23 and S24 contains an ideal component and an error component. The following description assumes that all the detection signals S21, S22, S23 and S24 are adjusted in level so that the centers of changes of their ideal components come to zero. The ideal components of the detection signals S21, S22, S23 and S24 are different in phase from each other and have a predetermined phase relationship with each other. In the present embodiment, in particular, the ideal components of the detection signals S21 and S22 are different in phase from each other by 180°. The ideal components of the detection signals S21 and S23 are different in phase from each other by 90°. The ideal components of the detection signals S23 and S24 are different in phase from each other by 180°.

Figure 17:
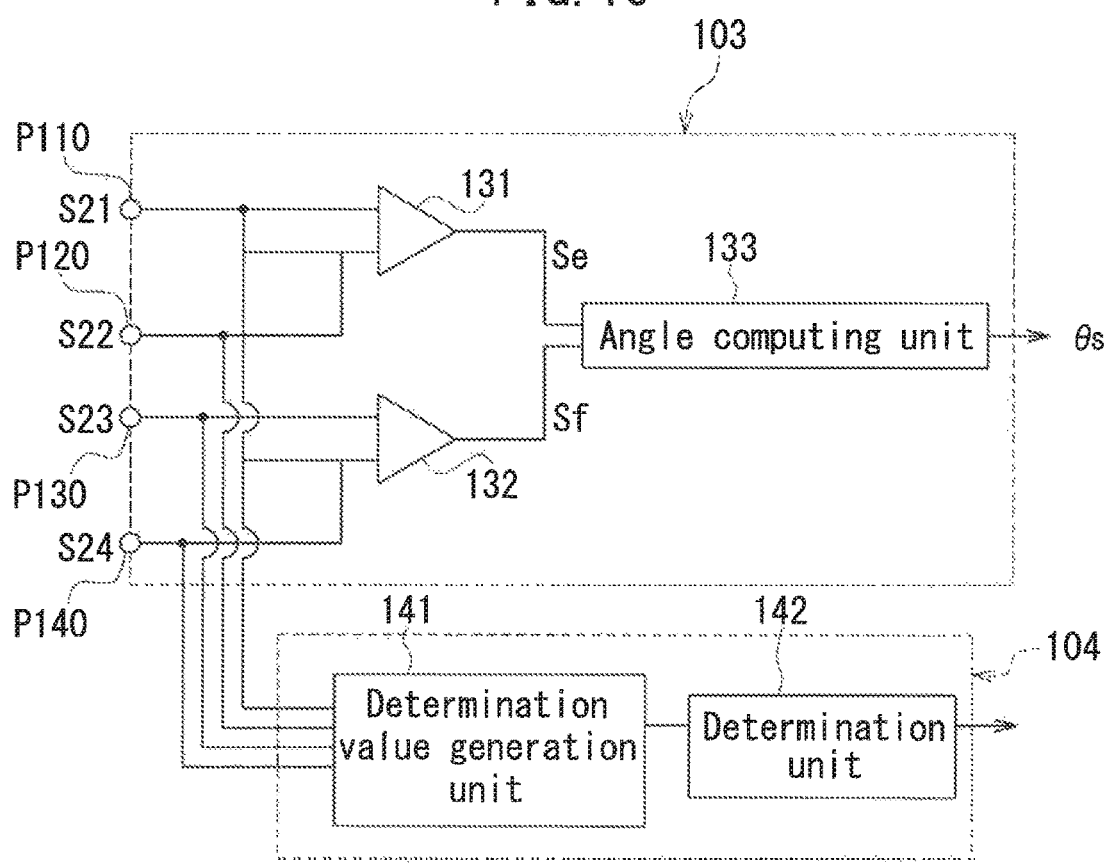
FIG. 17 is a functional block diagram illustrating the configuration of an angle detection unit and a condition determination apparatus of the angle sensor according to the second embodiment of the invention.

Reference is now made to FIG. 17 to describe the angle detection unit 103 and the condition determination apparatus 104. FIG. 17 is a functional block diagram illustrating the configuration of the angle detection unit 103 and the condition determination apparatus 104. The angle detection unit 103 and the condition determination apparatus 104 can be implemented by an application-specific integrated circuit (ASIC) or a microcomputer, for example.

The angle detection unit 103 performs an operation using the first to fourth detection signals S21, S22, S23 and S24 to generate the detected angle value θs having a correspondence with the angle θ to be detected. The angle detection unit 103 includes input ports P110, P120, P130 and P140 for receiving the detection signals S21, S22, 523 and S24, respectively. The angle detection unit 103 further includes computing units 131 and 132 and an angle computing unit 133.

The computing unit 131 generates a signal Se indicative of a difference between the detection signal S21 received at the input port P110 and the detection signal S22 received at the input port P120. The computing unit 132 generates a signal Sf indicative of a difference between the detection signal S23 received at the input port P130 and the detection signal S24 received at the input port P140. The angle computing unit 133 generates the detected angle value θs by performing an operation using the signals Se and Sf generated by the computing units 131 and 132. The signals Se and Sf are expressed by the following Eqs. (13) and (14), respectively.

$$Se = S21 - S22 \tag{13}$$

$$Sf = S23 - S24 \tag{14}$$

Figure 18:
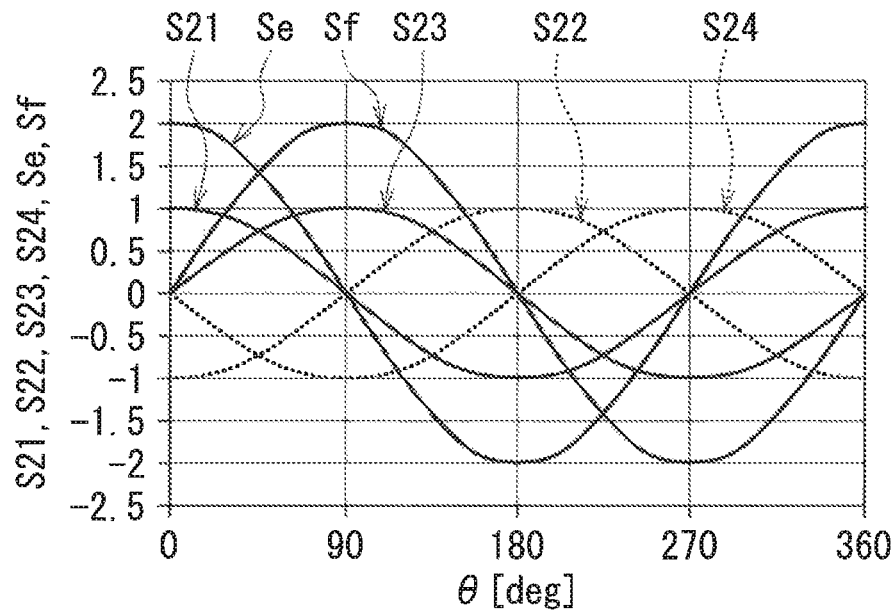
FIG. 18 is a waveform diagram illustrating the waveforms of a plurality of signals for use in the generation of a detected angle value by the angle detection unit shown in FIG. 17.

FIG. 18 is a waveform diagram illustrating the waveforms of the first to fourth detection signals S21, S22, S23 and S24 and the signals Se and Sf. In FIG. 18, the horizontal axis represents the angle θ to be detected, and the vertical axis represents the signals S21, S22, S23, S24, Se and Sf in relative values.

The angle computing unit 133 is configured and operates in the same manner as the angle computing unit 33 of the first embodiment shown in FIG. 5 except that the computing unit 337 performs a different operation. How the angle computing unit 133 operates will be described with reference to FIG. 5. In the angle computing unit 133, the normalization unit 331 normalizes the signal Se to generate a signal Sen. The normalization unit 332 normalizes the signal Sf to generate a signal Sfn. The normalization units 331 and 332 normalize the signals Se and Sf to generate the signals Sen and Sfn so that the signals Sen and Sfn both have a maximum value of 1 and a minimum value of −1.

The adder unit 333 adds up the signals Sen and Sfn to generate a signal Sg. The subtractor unit 334 subtracts the signal Sfn from the signal Sen to generate a signal Sh.

The normalization unit 335 normalizes the signal Sg to generate a signal Sgn. The normalization unit 336 normalizes the signal Sh to generate a signal Shn. The normalization units 335 and 336 normalize the signals Sg and Sh to generate the signals Sgn and Shn so that the signals Sgn and Shn both have a maximum value of 1 and a minimum value of −1.

The computing unit 337 performs an operation expressed by the following Eq. (15) to generate the detected angle value θs. Note that "atan" in Eq. (15) represents arctangent.

$$\theta s = atan(Sgn/Shn) + C2 \tag{15}$$

In Eq. (15), C12 is a constant representing an angle. For example, the constant C2 is −45°. The constant C2 may be adjusted according to such factors as the mounting precision of the detection signal generation unit 102.

If θs is in the range of 0° to less than 360°, θs in Eq. (15) has two solutions 180° different in value. Which of the two solutions of θs in Eq, (15) is the true value of θs can be determined from the combination of positive and negative signs of Sgn and Shn. The computing unit 337 determines θs within the range of 0° to less than 360° on the basis of Eq. (15) and the foregoing determination on the combination of positive and negative signs of Sgn and Shn.

The condition determination apparatus 104 shown in FIG. 7 will now be described. The condition determination apparatus 104 includes a determination value generation unit 141 and a determination unit 142. The determination value generation unit 141 generates at least one determination value by performing an operation using the first to fourth detection signals S21, S22, S23 and S24 received at the input ports P110, P120, P130 and P140, respectively. The determination unit 142 determines whether the angle sensor 1 is in a predetermined condition, i.e., the normal condition, by determining whether the at least one determination value falls within the determination range.

When the angle sensor 1 is in the predetermined condition, the at least one determination value varies depending on a predetermined physical quantity, i.e., the angle θ to be detected. In such a case, the at least one determination value when the angle sensor 1 is in the predetermined condition can be said to contain an ideal value component and a determination-value variation component, the determination-value variation component varying depending on the predetermined physical quantity, i.e., the angle θ to be detected. In the present embodiment, the variation of the at least one determination value when the angle sensor 1 is in the predetermined condition particularly results from the error components of the detection signals S21, S22, S23 and S24 described previously.

In the present embodiment, in particular, the determination value generation unit 141 normalizes the first to fourth detection signals S21, S22, S23 and S24 received at the input ports P110, P120, P130 and P140 so that those signals have a maximum value of 1 and a minimum value of −1. In the following description concerning the functions of the determination value generation unit 141 and the determination unit 142, the first to fourth detection signals S21, S22, S23 and S24 refer to the normalized signals unless otherwise specified.

The determination value generation unit 141 generates a first determination value VHS1 by performing an operation including determining the sum of the first detection signal S21 and the second detection signal S22, and generates a second determination value VHS2 by performing an operation including determining the sum of the third detection signal S23 and the fourth detection signal S24. The "operation including determining the sum of the first detection signal S21 and the second detection signal S22" includes multiplying the determined sum of the detection signals S21 and S22 by a predetermined coefficient for normalization or other purposes, or adding/subtracting a predetermined value to/from the determined sum of the detection signals S21 and S22. The detection signals S21 and S22 used in this operation include the normalized ones. Likewise, the "operation including determining the sum of the third detection signal S23 and the fourth detection signal S24" includes multiplying the determined sum of the detection signals S23 and S24 by a predetermined coefficient for normalization or other purposes, or adding/subtracting a predetermined value to/from the determined sum of the detection signals S23 and S24. The detection signals S23 and S24 used in this operation include the normalized ones. The first and second determination values VHS1 and VHS2 are expressed by the following Eqs. (16) and (17), respectively.

$$VHS1 = S21 + S22 \tag{16}$$

$$VHS2 = S23 + S24 \tag{17}$$

If each of the detection signals S21, S22, S23 and S24 is composed only of the ideal component and the angle sensor 1 has not failed, the first determination value VHS1 is composed only of a first ideal value component, and the second determination value VHS2 is composed only of a second ideal value component. In the present embodiment, in particular, the first and second ideal value components are of a constant value, which specifically is 0, regardless of the angle θ to be detected.

In the cases other than when each of the detection signals S21, S22, S23 and S24 is composed only of the ideal component and the angle sensor 1 has not failed, at least one of the first and second determination values VHS1 and VHS2 may differ from the value of at least one of the first and second ideal value components corresponding thereto. If the first determination value VHS1 differs from the value of the first ideal value component, the first determination value VHS1 can vary depending on the angle θ to be detected. Likewise, if the second determination value VHS2 differs from the value of the second ideal value component, the second determination value VHS2 can vary depending on the angle θ to be detected.

If each of the detection signals S21, S22, S23 and S24 contains an error component, the first and second determination values VHS1 and VHS2 vary depending on the angle θ to be detected when the angle sensor 1 is in the predetermined condition, i.e., the normal condition. In such a case, the first determination value VHS1 can be said to contain a first ideal value component and a first variation component, and the second determination value VHS2 can be said to contain a second ideal value component and a second variation component. The first and second variation components vary depending on the angle θ to be detected. The variations of the first and second determination values VHS1 and VHS2 when the angle sensor 1 is in the predetermined condition result from the error components of the detection signals S21, S22, S23 and S24.

In the present embodiment, the determination unit 142 defines a first determination range and a second determination range. The determination unit 142 also defines a first threshold value TH11, a second threshold value TH12, a third threshold value TH21, and a fourth threshold value TH22. The first threshold value TH11 represents the lower end of the first determination range, and the second threshold value TH12 represents the upper end of the first determination range. The first determination range thus extends from the first threshold value TH11 to the second threshold value TH12. The third threshold value TH21 represents the lower end of the second determination range, and the fourth threshold value TH22 represents the upper end of the second determination range. The second determination range thus extends from the third threshold value TH21 to the fourth threshold value TH12.

Hereinafter, the breadth of the range over which the first determination value VHS1 varies depending on the angle θ to be detected when the angle sensor 1 is in the predetermined condition will be referred to as a first determination-value variation range. The first determination-value variation range is the difference between a maximum value and a minimum value of the first determination value VHS1 when the angle sensor 1 is in the predetermined condition. The breadth of the range over which the second determination value VHS2 varies depending on the angle θ to be detected when the angle sensor 1 is in the predetermined condition will be referred to as a second determination-value variation range. The second determination-value variation range is the difference between a maximum value and a minimum value of the second determination value VHS2 when the angle sensor 1 is in the predetermined condition.

The difference between the first threshold value TH11 and the first determination value VHS1 when the angle sensor 1 is in the predetermined condition will be referred to as a first gap. The breadth of the range over which the first gap varies depending on the angle 74 to be detected will be referred to as a first gap variation range. The first gap variation range is the difference between a maximum value and a minimum value of the first gap. The difference between the second threshold value TH12 and the first determination value VHS1 when the angle sensor 1 is in the predetermined condition will be referred to as a second gap. The breadth of the range over which the second gap varies depending on the angle θ to be detected will be referred to as a second gap variation range. The second gap variation range is the difference between a maximum value and a minimum value of the second gap.

The difference between the third threshold value TH21 and the second determination value VHS2 when the angle sensor 1 is in the predetermined condition will be referred to as a third gap. The breadth of the range over which the third gap varies depending on the angle θ to be detected will be referred to as a third gap variation range. The third gap variation range is the difference between a maximum value and a minimum value of the third gap. The difference between the fourth threshold value TH22 and the second determination value VHS2 when the angle sensor 1 is in the predetermined condition will be referred to as a fourth gap. The breadth of the range over which the fourth gap varies depending on the angle θ to be detected will be referred to as a fourth gap variation range. The fourth gap variation range is the difference between a maximum value and a minimum value of the fourth gap.

The determination unit 142 varies the first and second threshold values TH11 and TH12 so as to make the first and second gap variation ranges smaller than the first determination-value variation range. The determination unit 142 also varies the third and fourth threshold values TH21 and TH22 so as to make the third and fourth gap variation ranges smaller than the second determination-value variation range.

Now, the first to fourth threshold values TH11, TH12, TH21 and TH22 will be specifically described. The first to fourth threshold values TH11, TH12, TH21 and TH22 are expressed by the following Eqs. (18), (19), (20) and (21), respectively.

$$TH11 = SV11 + FC1 \tag{18}$$

$$TH12 = SV12 + FC1 \tag{19}$$

$$TH21 = SV21 + FC2 \tag{20}$$

$$TH22 = SV22 + FC2 \tag{21}$$

SV11 is a first reference value, SV12 is a second reference value, SV21 is a third reference value, and SV22 is a fourth reference value. The first to fourth reference values SV11, SV12, SV21 and SV22 are all constant values. The second reference value SV12 is larger than the first reference value SV11. The fourth reference value SV22 is larger than the third reference value SV21.

Both FC1 and FC2 are threshold-value variation components which vary depending on the angle θ to be detected. Each of the threshold-value variation components FC1 and FC2 is generated by using at least one of the first to fourth detection signals S21, S22, S23 and S24. In this way, the determination unit 142 varies the first to fourth threshold values TH11, TH12, TH21 and TH22 by using at least one of the first to fourth detection signals S21, S22, S23 and S24.

Now, an example of the threshold-value variation components FC1 and FC2 will be described. In this example, the threshold-value variation components FC1 and FC2 are expressed by the following Eqs. (22) and (23), respectively. In Eq. (22). "d", "e", and "f" are coefficients. In Eq. (23), "g", "h", and "i" are coefficients.

$$FC1 = d \cdot S21 + e \cdot S23 + f \quad (22)$$

$$FC2 = g \cdot S21 + h \cdot S23 + i \quad (23)$$

The meaning of the threshold-value variation components FC1 and FC2 of the foregoing example will be described. One of the main causes of the first variation. component contained in the first determination value VHS1 when the angle sensor 1 is in the normal condition is that the phase of at least one of the detection signals S21 and S22 deviates from a desired phase in the light of accuracy of manufacture of the angle sensor 1 or other factors. In such a case, the at least one of the detection signals S21 and S22 contains the first-order error component. As a result, the first determination value VHS1 contains the first variation component. The first variation component has a period equal to that of the ideal components of the detection signals S21 and S22. Likewise, the second determination value VHS2 contains the second variation component. The second variation component has a period equal to that of the ideal components of the detection signals S23 and S24.

The threshold-value variation component FC1 is an approximate value of the first variation component. The threshold-value variation component FC1 is derived in the following manner. The first variation component can be expressed as $d \cdot \cos \theta + e \cdot \sin \theta + f$. Here, $\cos \theta$ corresponds to the ideal component of the first detection signal S21, and $\sin \theta$ corresponds to the ideal component of the third detection signal S23. If $\cos \theta$ is approximated as S21 and $\sin \theta$ is approximated as S23, the first variation component can be approximated as $d \cdot S21 + e \cdot S23 + f$. From the foregoing, the threshold-value variation component FC1 expressed by Eq. (22) can be said to be an approximate value of the first variation component.

Similarly, the threshold-value variation component FC2 expressed by Eq. (23) can be said to be an approximate value of the second variation component. The values of the coefficients "d", "e" and "f" in Eq. (22) and the coefficients "g", "h" and "i" in Eq. (23) are determined, for example, according to the results of measurements of the determination values VHS1 and VHS2 performed before shipment of the non-failed angle sensor 1.

The first variation component and the second variation component are extremely smaller in amplitude than the ideal component of each of the detection signals S21, S22, S23 and S24. Thus, the values of the coefficients "d" and "e" in Eq. (22) and the coefficients "g" and "h" in Eq. (23) are also extremely smaller than the amplitude of the ideal component of each of the detection signals S21, S22, S23 and S24. More specifically, the values of the coefficients "d", "e", "g" and "h" are each 10% or less of the amplitude of the ideal component of each of the detection signals S21, S22, 523 and S24.

Varying the first and second threshold values TH11 and TH12 using the aforementioned example of the threshold-value variation component FC1 causes the first and second gap variation ranges to be much smaller than the first determination-value variation range. Likewise, varying the third and fourth threshold values TH21 and TH22 using the aforementioned example of the threshold-value variation component FC2 causes the third and fourth gap variation ranges to be much smaller than the second determination-value variation range.

The determination unit 142 determines that the angle sensor 1 is in the normal condition if the first determination value VHS1 falls within the first determination range and the second determination value VHS2 falls within the second determination range. In other cases, the determination unit 142 determines that the angle sensor 1 has failed. The determination unit 142 outputs a signal indicating the determination result. The first to fourth reference values SV11, SV12, SV21 and SV22 are determined to enable detection of such a failure of the angle sensor 1 that the angular error AE exceeds an allowable range, as in the first embodiment, for example.

A condition determination method according to the present embodiment will now be described. The condition determination method according to the present embodiment is a method for determining whether the angle sensor 1 according to the present embodiment is in a predetermined condition, i.e., the normal condition. The condition determination method is performed by the condition determination apparatus 104 according to the present embodiment.

The condition determination method according to the present embodiment is basically as shown in the flowchart of FIG. 8. In step S101 of the present embodiment, the first and second determination values VHS1 and VHS2 are generated by performing an operation using the detection signals S21, S22, S23 and S24. Step S101 of the present embodiment is performed by the determination value generation unit 141 shown in FIG. 17. The details of step S101 are the same as the details of the operation of the determination value generation unit 141 described above.

In step S102 of the present embodiment, the angle sensor 1 is determined to be in the normal condition if the first determination value VHS1 falls within the first determination range and the second determination value VHS2 falls within the second determination range. In other cases, the angle sensor 1 is determined to have failed. Step S102 of the present embodiment is performed by the determination unit 142 shown in FIG. 17. The details of step S102 are the same as the details of the operation of the determination unit 142 described above.

Figure 19:
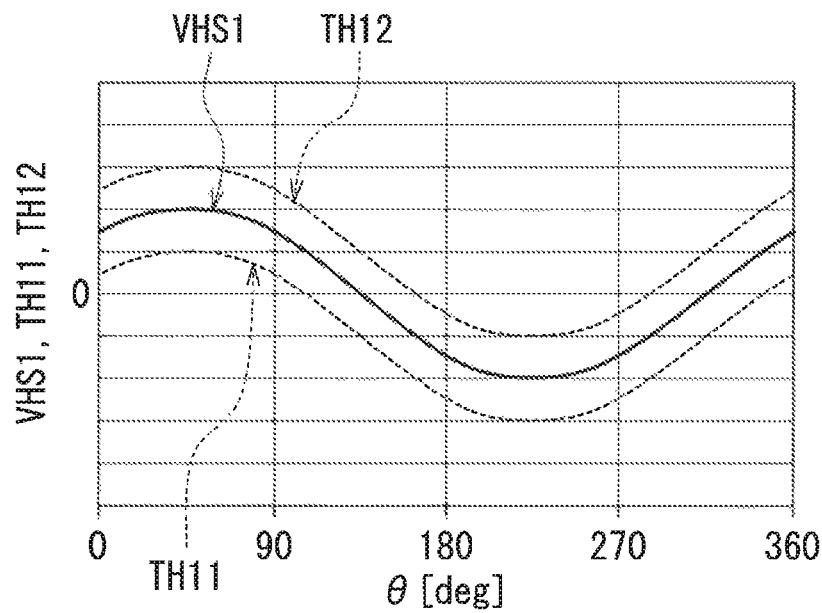
FIG. 19 is a waveform diagram illustrating an example of waveforms of a first determination value and first and second threshold values of the second embodiment of the invention.

The effects of the angle sensor 1 according to the present embodiment will now be described with reference to FIG. 19. FIG. 19 is a waveform diagram illustrating an example of waveforms of the first determination value VHS1 and the first and second threshold values TH11 and TH12. In. FIG. 19, the horizontal axis represents the angle θ to be detected, and the vertical axis represents the first determination value VHS1 and the first and second threshold values TH11 and TH12 in relative values. Although not illustrated, the second determination value VHS2 and the third and fourth threshold values TH21 and TH22 have waveforms that are respectively similar to those of the first determination value VHS1 and the first and second threshold values TH11 and TH12 shown in FIG. 19.

Now, a description will be given of an angle sensor of a second comparative example. The angle sensor of the second comparative example includes a determination unit of the second comparative example, instead of the determination unit 142, to determine whether the angle sensor is in a predetermined condition. In the second comparative example, the determination unit defines first and second determination ranges of the second comparative example. Each of the first and second determination ranges of the second comparative example has invariable two threshold values representing both ends of the range.

The angle sensor of the second comparative example has the following problem. For the angle sensor of the second comparative example, to prevent a situation in which the angle sensor is determined to have failed even though the angle sensor is in the normal condition, the first and second determination ranges of the second comparative example need to be set as follows. The first determination range of the second comparative example needs to be a range that includes and is wider than the variation range of the first determination value VHS1 when the angle sensor is in the normal condition. The second determination range of the second comparative example needs to be a range that includes and is wider than the variation range of the second determination value VHS2 when the angle sensor is in the normal condition. However, if the first and second determination ranges of the second comparative example are set to such ranges, it is not possible to accurately detect a failure of the angle sensor as in the case of the first comparative example described in relation to the first embodiment.

In contrast to this, according to the present embodiment, the first and second gap variation ranges are much smaller than the first determination-value variation range, and the third and fourth gap variation ranges are much smaller than the second determination-value variation range, as described above. As a result, the present embodiment achieves reduction of the first to fourth gaps while preventing a situation in which the angle sensor 1 is determined to have failed even in the normal condition. This enables at least one of the first and second determination values VHS1 and VHS2 to exceed the determination range at the instant when the angle sensor 1 fails actually. Consequently, the present embodiment enables accurate determination of the condition of the angle sensor 1, i.e., whether the angle sensor 1 has failed.

Suppose that the threshold-value variation components FC1 and FC2 expressed by Eqs. (22) and (23), respectively, are employed and there occurs such a failure of the angle sensor 1 that the detection signal S21 or S23 changes from that in the normal condition. In such a case, the threshold-value variation components FC1 and FC2 change from those in the normal condition. However, the values of the coefficients "d" and "e" in Eq. (22) and the coefficients "g" and "h" in Eq. (23) are extremely smaller than the amplitudes of the ideal components of the detection signals S21 and S23. Thus, in the event of such a failure of the angle sensor 1 that the detection signal S21 or S23 changes from that in the normal condition, the amounts of change of the threshold-value variation components FC1 and FC2 are extremely smaller than those of the determination values VHS1 and VHS2. It is thus possible to accurately detect the failure of the angle sensor 1 by using the first and second determination ranges even in the event of the aforementioned failure.

The other configuration, function and effects of the present embodiment are similar to those of the first embodiment except a configuration unique to that of the first embodiment and the function and effects based on the same.

Third Embodiment

A third embodiment of the invention will now be described. The angle sensor 1 according to the third embodiment is the same as the angle sensor 1 according to the second embodiment except for the details of the operations of the determination value generation unit 141 and the determination unit 142 of the condition determination apparatus 104.

The determination value generation unit 141 of the present embodiment normalizes the first to fourth detection signals S21, S22, S23 and S24 received at the input ports P110, P120, P130 and P140 so that those signals have a maximum value of 1 and a minimum value of −1, as in the second embodiment. In the following description concerning the operations of the determination value generation unit 141 and the determination unit 142, the first to fourth detection signals S21, S22, S23 and S24 refer to the normalized signals unless otherwise specified.

The determination value generation unit 141 generates one determination value dLr by performing an operation using the first to fourth detection signals S21, S22, S23 and S24. In the present embodiment, in particular, the determination value generation unit 141 generates the determination value dLr by performing an operation including determining the sum of the square of a difference between the first detection signal S21 and the second detection signal S22 and the square of a difference between the third detection signal S23 and the fourth detection signal S24. The "operation including determining the sum of the square of a difference between the first detection signal S21 and the second detection signal S22 and the square of a difference between the third detection signal S23 and the fourth detection signal S24" includes multiplying the determined sum by a predetermined coefficient for normalization or other purposes, or adding/subtracting a predetermined value to/from the determined sum. The detection signals S21, S22, S23 and S24 used in this operation include the normalized ones.

The operation for generating the determination value dLr will now be described specifically. The determination value generation unit 141 first performs an operation expressed by the following Eq. (24) to generate an initial determination value Lr.

$$Lr=(S21-S22)^2+(S23-S24)^2 \quad (24)$$

Then, the determination value generation unit 141 performs an operation expressed by the following Eq. (25) to generate the determination value dLr.

$$dLr=Lr-Lrav \quad (25)$$

Lrav in Eq. (25) is an average of the initial determination value Lr when the angle sensor 1 is in the normal condition and the angle θ to be detected changes from 0° to 360°. The average Lrav is determined, for example, according to the result of a measurement of the initial determination value Lr performed before shipment of the non-failed angle sensor 1.

If each of the detection signals S21, S22, S23 and S24 is composed only of the ideal component and the angle sensor 1 has not failed, the determination value dLr is composed only of the ideal value component. The ideal value component is of a constant value, which specifically is 0, regardless of the angle θ to be detected.

In the cases other than when each of the detection signals S21, S22, S23 and S24 is composed only of the ideal component and the angle sensor 1 has not failed, the determination value dLr may differ from the value of the ideal value component. If the determination value dLr differs from the value of the ideal value component, the determination value dLr can vary depending on the angle θ to be detected.

If each of the detection signals S21, S22, S23 and S24 contains an error component, the determination value dLr varies depending on the angle θ to be detected when the angle sensor 1 is in the predetermined condition, i.e., the normal condition. In such a case, the determination value dLr can be said to contain an ideal value component and a variation component, the variation component varying depending on the angle θ to be detected. The variation of the determination value dLr when the angle sensor 1 is in the predetermined condition results from the error components of the detection signals S21, S22, S23 and S24.

In the present embodiment, the determination unit 142 defines one determination range, a first threshold value TH31, and a second threshold value TH32. The first threshold value TH31 represents the lower end of the determination range, and the second threshold value value TH32 represents the upper end of the determination range. The determination range thus extends from the first threshold value TH31 to the second threshold value TH32.

Hereinafter, the breadth of the range over which the determination value dLr varies depending on the angle θ to be detected when the angle sensor 1 is in the predetermined condition will be referred to as a determination-value variation range. The determination-value variation range is the difference between a maximum value and a minimum value of the determination value dLr when the angle sensor 1 is in the predetermined condition.

The difference between the first threshold value TH31 and the determination value dLr when the angle sensor 1 is in the predetermined condition will be referred to as a first gap. The breadth of the range over which the first gap varies depending on the angle θ to be detected will be referred to as a first gap variation range. The first gap variation range is the difference between a maximum value and a minimum value of the first gap. The difference between the second threshold value TH32 and the determination value dLr when the angle sensor 1 is in the predetermined condition will be referred to as a second gap. The breadth of the range over which the second gap varies depending on the angle θ to be detected will be referred to as a second gap variation range. The second gap variation range is the difference between a maximum value and a minimum value of the second gap.

The determination unit 142 varies the first and second threshold values TH31 and TH32 so as to make the first and second gap variation ranges smaller than the determination-value variation range.

Now, the first and second threshold values TH31 and TH32 will be specifically described. The first and second threshold values TH31 and TH32 are expressed by the following Eqs. (26) and (27), respectively.

$$TH31 = SV31 + FC3 \quad (26)$$

$$TH32 = SV32 + FC3 \quad (27)$$

SV31 is a first reference value, and SV32 is a second reference value. Both the first and second reference values SV31 and SV32 are constant values. The second reference value SV32 is larger than the first reference value SV31.

FC3 is a threshold-value variation component which varies depending on the angle θ to be detected. The threshold-value variation component FC3 is generated using at least one of the first to fourth detection signals S21, S22, S23 and S24. In this way, the determination unit 142 varies the first and second threshold values TH31 and TH32 by using at least one of the first to fourth detection signals S21, S22, S23 and S24.

Now, first and second examples of the threshold-value variation component FC3 will be described. The first example of the threshold-value variation component FC3 is expressed by the following Eq. (28). In Eq. (28), "j" and "k" are coefficients.

$$FC3 = j \cdot (8 \cdot S21^4 - 8 \cdot S21^2 + 1) + k \quad (28)$$

The meaning of the first example of the threshold-value variation component FC3 will be described. One of the main causes of a variation component contained in the determination value dLr when the angle sensor 1 is in the normal condition is that the detection signals S21, S22, S23 and S24 contain the respective third harmonic error components. If the determination value dLr is generated by Eqs. (24) and (25), the resulting determination value dLr contains a variation component. The variation component has a period of ¼ the period of the ideal components of the detection signals S21, S22, S23 and S24. Such a variation component will hereinafter be referred to as the fourth-order variation component.

The first example of the threshold-value variation component FC3 is an approximate value of the fourth-order variation component. The first example of the threshold-value variation component FC3 is derived in the following manner. The fourth-order variation component can be expressed as $j \cdot \cos(4\theta) + k$. This can be transformed into $j \cdot (8 \cdot \cos^4\theta - 8 \cdot \cos^2\theta + 1) + k$. Here, cos θ corresponds to the ideal component of the first detection signal S21. Then, cos θ (can be approximated as S21. In such a case, the fourth-order variation component can be approximated as $j \cdot (8 \cdot S21^4 - 8 \cdot S21^2 \pm 1) + k$. From the foregoing, the threshold-value variation component FC3 expressed by Eq. (28) can thus be said to be an approximate value of the fourth-order variation component. The values of the coefficients "j" and "k" in Eq. (28) are determined, for example, according to the result of a measurement of the determination value dLr performed before shipment of the non-failed angle sensor 1.

The fourth-order variation component is extremely smaller in amplitude than the ideal components of the detection signals S21, S22, S23 and S24. Thus, the value of the coefficient "j" in Eq. (28) is also extremely smaller than the amplitude of the ideal component of each of the detection signals S21, S22, S23 and S24. More specifically, the value of the coefficient "j" is 10% or less of the amplitude of the ideal component of each of the detection signals S21, S22, S23 and S24.

If at least one of the detection signals S21, S22, S23 and S24 contains the first-order error component, the phase of the fourth-order variation component deviates from that in the case where none of the detection signals S21, S22, S23 and S24 contains the first-order error component. The second example of the threshold-value variation component FC3 is intended to accommodate such a situation.

The second example of the threshold-value variation component FC3 is expressed by the following Eq. (29). In Eq. (29), "j", "k", and "m" are coefficients.

$$FC3 = j \cdot (8 \cdot S21^4 - 8 \cdot S21^2 + 1) + m \cdot (8S23^4 - 8 \cdot S23^2 + 1) + k \quad (29)$$

The second example of the threshold-value variation component FC3 contains the two detection signals S21 and S23. Thus, when employing the second example of the threshold-value variation component FC3, the determination unit 142 uses the two detection signals S21 and S23 to vary the first and second threshold values TH31 and TH32.

The values of the coefficients "j" and "m" can be adjusted to change the phase of the second example of the threshold-value variation component FC3. This enables setting the threshold-value variation component FC3 approximating the fourth-order variation component even when at least one of the detection signals S21, S22, S23 and S24 contains the first-order error component. The values of the coefficients "j", "k" and "m" in Eq. (29) are determined, for example, according to the result of a measurement of the determination value dLr performed before shipment of the non-failed angle sensor 1. Like the coefficient "j", the value of the coefficient "m" is extremely smaller than the amplitude of the ideal component of each of the detection signals S21, S22, S23 and S24. More specifically, the value of the coefficient "m" is 10% or less of the amplitude of the ideal component of each of the detection signals S21, S22, S23 and S24.

When the determination value dLr contains the fourth-order variation component, varying the first and second threshold values TH31 and TH32 using the first or second example of the threshold-value variation component FC3 causes the first and second gap variation ranges to be much smaller than the determination-value variation range.

The determination unit 142 determines that the angle sensor 1 is in the normal condition if the determination value dLr falls within the determination range. In other cases, the determination unit 142 determines that the angle sensor 1 has failed. The determination unit 142 outputs a signal indicating the determination result. The first and second reference values SV31 and SV32 are determined to enable detection of such a failure of the angle sensor 1 that the angular error AE exceeds an allowable range, as in the first embodiment, for example.

A condition determination method according to the present embodiment will now be described. The condition determination method according to the present embodiment is a method for determining whether the angle sensor 1 according to the present embodiment is in a predetermined condition or the normal condition. The condition determination method is performed by the condition determination apparatus 104 according to the present embodiment.

The condition determination method according to the present embodiment is basically as shown in the flowchart of FIG. 8. In step S101 of the present embodiment, the determination value dLr is generated by performing an operation using the detection signals S21, S22, S23 and S24. Step S101 of the present embodiment is performed by the determination value generation unit 141 shown in FIG. 17. The details of step S101 are the same as the details of the operation of the determination value generation unit 141 described previously.

In step S102 of the present embodiment, the angle sensor 1 is determined to be in the normal condition if the determination value dLr falls within the determination range. In other cases, the angle sensor 1 is determined to have failed. Step S102 of the present embodiment is performed by the determination unit 142 shown in FIG. 17. The details of step S102 are the same as the details of the operation of the determination unit 142 described previously.

Figure 20:
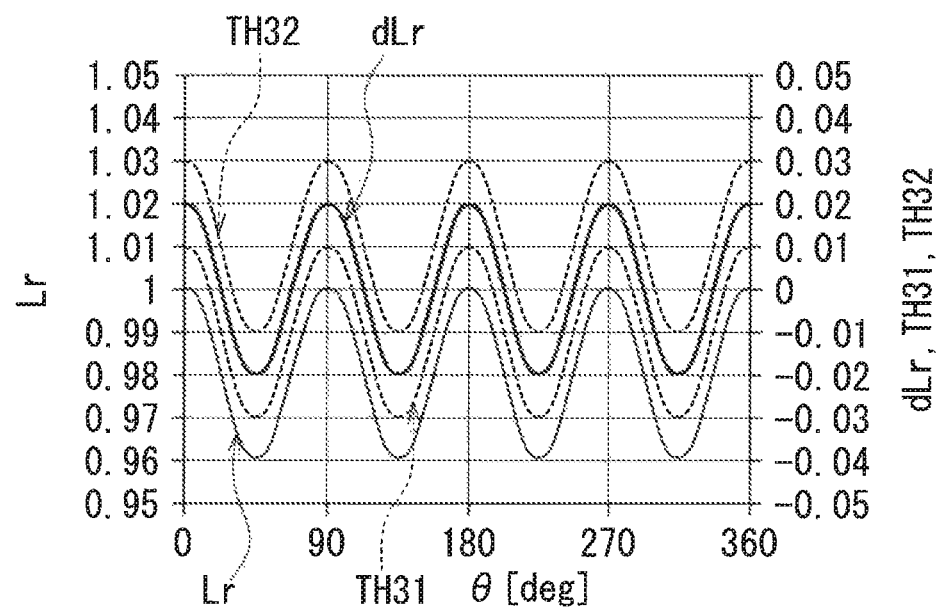
FIG. 20 is a waveform diagram illustrating an example of waveforms of a determination value and first and second threshold values of a third embodiment of the invention.

The effects of the angle sensor 1 according to the present embodiment will now be described with reference to FIG. 20. FIG. 20 is a waveform diagram illustrating an example of waveforms of the initial determination value Lr, the determination value dLr, and the first and second threshold values TH31 and TH32. In FIG. 20, the horizontal axis represents the angle θ to be detected, and the vertical axes represent the initial determination value Lr, the determination value dLr, and the first and second threshold values TH31 and TH32.

First, a description will be given of an angle sensor of a third comparative example. The angle sensor of the third comparative example includes a determination unit of the third comparative example, instead of the determination unit 142, to determine whether the angle sensor is in a predetermined condition. In the third comparative example, the determination unit defines a determination range of the third comparative example. The determination range of the third comparative example has invariable two threshold values representing both ends of the range.

The angle sensor of the third comparative example has the following problem. For the angle sensor of the third comparative example, to prevent a situation in which the angle sensor is determined to have failed even though the angle sensor is in the normal condition, the determination range of the third comparative example needs to be set to a range that includes and is wider than the variation range of the determination value dLr when the angle sensor is in the normal condition. However, if the determination range of the third comparative example is set to such a range, it is not possible to accurately detect a failure of the angle sensor as in the case of the first comparative example described in relation to the first embodiment.

In contrast to this, according to the present embodiment, the first and second gap variation ranges are much smaller than the determination-value variation range, as described previously. As a result, the present embodiment achieves reduction of the first and second gaps while preventing a situation in which the angle sensor 1 is determined to have failed even in the normal condition. This enables the determination value dLr to exceed the determination range at the instant when the angle sensor 1 fails actually. Consequently, the present embodiment enables accurate determination of the condition of the angle sensor 1, i.e., whether the angle sensor 1 has failed.

Suppose that the threshold-value variation component FC3 expressed by Eq. (28) is employed and there occurs such a failure of the angle sensor 1 that the detection signal S21 changes from that in the normal condition. In such a case, the threshold-value variation component FC3 changes from that in the normal condition. However, the value of the coefficient "j" in Eq. (28) is extremely smaller than the amplitude of the ideal component of the detection signal S21. Thus, in the event of such a failure of the angle sensor 1 that the detection signal S21 changes from that in the normal condition, the amount of change of the threshold-value variation component FC3 is extremely smaller than that of the determination value dLr. It is thus possible to accurately detect the failure of the angle sensor 1 by using the determination range defined by the first and second threshold values TH31 and TH32 even in the event of the aforementioned failure.

Also, suppose that the threshold-value variation component FC3 expressed by Eq. (29) is employed and there occurs such a failure of the angle sensor 1 that the detection signal S21 or S23 changes from that in the normal condition. In such a case, the threshold-value variation component FC3 changes from that in the normal condition. However, the values of the coefficients "j" and "m" in Eq. (29) are extremely smaller than the amplitudes of the ideal components of the detection signals S21 and S23. Thus, in the event of such a failure of the angle sensor 1 that the detection signal S21 or S23 changes from that in the normal condition, the amount of change of the threshold-value variation component FC3 is extremely smaller than that of the determination value dLr. It is thus possible to accurately detect the failure of the angle sensor 1 by using the determination range defined by the first and second threshold values TH31 and TH32 even in the event of the aforementioned failure.

The other configuration, function and effects of the third embodiment are the same as those of the second embodiment.

Fourth Embodiment

A fourth embodiment of the invention will now be described. The angle sensor 1 according to the fourth embodiment includes a detection signal generation unit 202, an angle detection unit 203 and a condition determination apparatus 204, in place of the detection signal generation unit 2, the angle detection unit 3 and the condition determination apparatus 4 of the first embodiment. The detection signal generation unit 202 and the angle detection unit 203 correspond to the physical quantity information generation unit.

Figure 21:
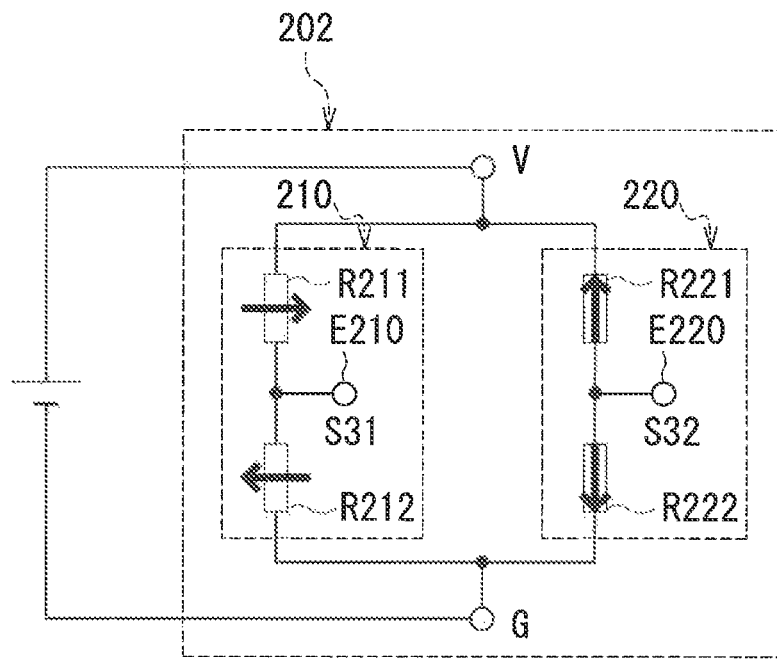
FIG. 21 is a circuit diagram illustrating the configuration of a detection signal generation unit of an angle sensor according to a fourth embodiment of the invention.
Figure 21:
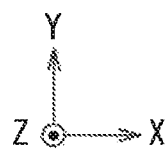

First, the detection signal generation unit 202 will be described with reference to FIG. 21. FIG. 21 is a circuit diagram illustrating the configuration of the detection signal generation unit 202. The detection signal generation unit 202 generates a first detection signal S31 and a second detection signal S32 each having a correspondence with the angle θ to be detected. The detection signal generation unit 202 includes a first detection circuit 210 for generating the first detection signal S31 and a second detection circuit 220 for generating the second detection signal S32. Each of the first and second detection circuits 210 and 220 includes at least one magnetic detection element for detecting the rotating magnetic field MF. The detection signal generation unit 202 further includes a power supply port V and a ground port G. A power supply voltage of predetermined magnitude, such as 5 volts, is applied between the power supply port V and the ground port G.

As the direction DM of the rotating magnetic field MF rotates with a predetermined period, the angle θ to be detected varies with the predetermined period. In such a case, the first and second detection signals S31 and S32 both vary periodically with a signal period equal to the predetermined period. The first and second detection signals S31 and S32 are different in phase from each other.

The first detection circuit 210 includes a pair of serially connected magnetic detection elements R211 and R212, and an output port E210. One end of the magnetic detection element R211 is connected to the power supply port V. The other end of the magnetic detection element R211 is connected to one end of the magnetic detection element R212 and the output port E210. The other end of the magnetic detection element R212 is connected to the ground port G. The output port E210 outputs the first detection signal S31 which corresponds to the potential at the connection point between the magnetic detection elements R211 and R212.

The second detection circuit 220 includes a pair of serially connected magnetic detection elements R221 and R222, and an output port E220. One end of the magnetic detection element R221 is connected to the power supply port V. The other end of the magnetic detection element R221 is connected to one end of the magnetic detection element R222 and the output port E220. The other end of the magnetic detection element R222 is connected to the ground port G. The output port E220 outputs the second detection signal S32 which corresponds to the potential at the connection point between the magnetic detection elements R221 and R222.

The magnetic detection elements R211, R212, R221 and R222 are configured in the same manner as the magnetic detection elements R11, R12, R21, R22, R31 and R32 of the first embodiment except for the magnetization directions of the magnetization pinned layers.

In the first detection circuit 210, the magnetization pinned layers of the MR elements included in the magnetic detection element R211 are magnetized in the X direction. This magnetization direction will hereinafter be referred to as the first direction D21. The magnetization pinned layers of the MR elements included in the magnetic detection element R212 are magnetized in the opposite direction to the first direction D21, that is, in the −X direction. In the first detection circuit 210, the potential at the connection point between the magnetic detection elements R211 and R212 varies depending on the strength of a component in the first direction D21 of the rotating magnetic field MF. Thus, the first detection circuit 210 detects the strength of the component in the first direction D21 of the rotating magnetic field MF and generates a signal indicative of the strength as the first detection signal S31. The strength of the component in the first direction D21 of the rotating magnetic field MF has a correspondence with the angle θ to be detected.

In the second detection circuit 220, the magnetization pinned layers of the MR elements included in the magnetic detection element R221 are magnetized in the Y direction. This magnetization direction will hereinafter be referred to as the second direction D22. The magnetization pinned layers of the MR elements included in the magnetic detection element R222 are magnetized in the opposite direction to the second direction D22, that is, in the −Y direction. In the second detection circuit 220, the potential at the connection point between the magnetic detection elements R221 and R222 varies depending on the strength of a component in the second direction D22 of the rotating magnetic field MF. Thus, the second detection circuit 220 detects the strength of the component in the second direction D22 of the rotating magnetic field MF and generates a signal indicative of the strength as the second detection signal S32. The strength of the component in the second direction D22 of the rotating magnetic field MF has a correspondence with the angle θ to be detected.

In the light of the production accuracy of the MR elements or other factors, the magnetization directions of the magnetization pinned layers of the plurality of MR elements in the detection circuits 210 and 220 may be slightly different from those described above.

When the angle θ to be detected varies with the predetermined period, each of the detection signals S31 and S32 contains an ideal component and an error component. The following description assumes that both of the detection signals S31 and S32 are adjusted in level so that the centers of changes of their ideal components come to zero. The ideal components of the detection signals S31 and S32 are different in phase from each other and have a predetermined phase relationship with each other. In the present embodiment, in particular, the ideal components of the detection signals S31 and S32 are different in phase from each other by 90°.

Figure 22:
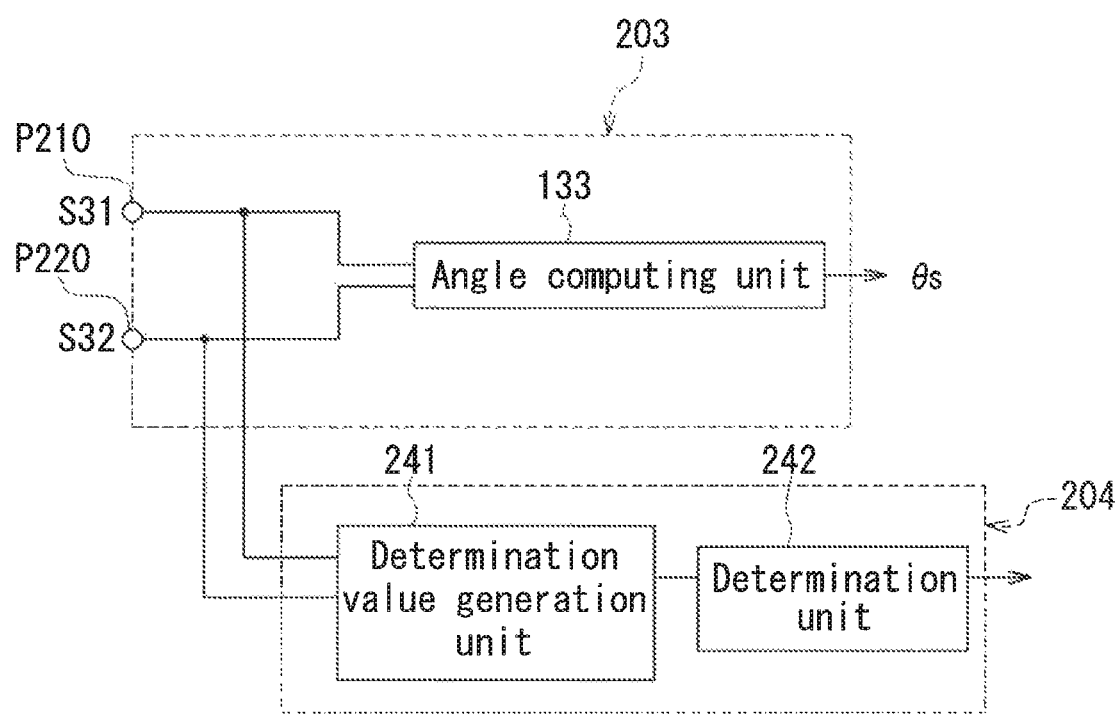
FIG. 22 is a functional block diagram illustrating the configuration of an angle detection unit and a condition determination apparatus of the angle sensor according to the fourth embodiment of the invention.

Reference is now made to FIG. 22 to describe the angle detection unit 203 and the condition determination apparatus 204. FIG. 22 is a functional block diagram illustrating the configuration of the angle detection unit 203 and the condition determination apparatus 204. The angle detection unit 203 and the condition determination apparatus 204 can be implemented by an application-specific integrated circuit (ASIC) or a microcomputer, for example.

The angle detection unit 203 performs an operation using the first and second detection signals S31 and S32 to generate the detected angle value θs having a correspondence with the angle θ to be detected. The angle detection unit 203 includes input ports P210 and P220 for receiving the detection signals S31 and S32, respectively, and an angle computing unit 133.

The angle computing unit 133 is configured and operates in the same manner as in the second embodiment except for the following differences. In the present embodiment, the normalization unit 331 (see FIG. 5) of the angle computing unit 133 receives the first detection signal S31 in place of the signal Se of the second embodiment. Further, the normalization unit 332 (see FIG. 5) of the angle computing unit 133 receives the second detection signal S32 in place of the signal Sf of the second embodiment.

The condition determination apparatus 204 shown in FIG. 22 will now be described. The condition determination apparatus 204 includes a determination value generation unit 241 and a determination unit 242.

The determination value generation unit 241 normalizes the first and second detection signals S31 and S32 received at the input ports P210 and P220 so that those signals have a maximum value of 1 and a minimum value of −1. In the following description concerning the operations of the determination value generation unit 241 and the determination unit 242, the first and second detection signals S31 and S32 refer to the normalized signals unless otherwise specified.

The determination value generation unit 241 generates one determination value dLr2 by performing an operation using the first and second detection signals S31 and S32. In the present embodiment, in particular, the determination value generation unit 241 generates the determination value dLr2 by performing an operation including determining the sum of the square of the first detection signal S31 and the square of the second detection signal S32. The "operation including determining the sum of the square of the first detection signal S31 and the square of the second detection signal S32" includes multiplying the determined sum by a predetermined coefficient for normalization or other purposes, or adding/subtracting a predetermined value to/from the determined sum. The detection signals S31 and S32 used in this operation include the normalized ones.

The operation for generating the determination value dLr2 will now be described specifically. The determination value generation unit 241 first performs an operation expressed by the following Eq. (30) to generate an initial determination value Lr2.

$$Lr2 = S31^2 + S32^2 \quad (30)$$

Then, the determination value generation unit 241 performs an operation expressed by the following Eq. (31) to generate the determination value dLr2.

$$dLr2 = Lr2 - Lr2av \quad (31)$$

Lr2av in. Eq. (31) is an average of the initial determination value Lr2 when the angle sensor 1 is in the normal condition and the angle θ to be detected changes from 0° to 360°. The average Lr2av is determined, for example, according to the result of a measurement of the initial determination value Lr2 performed before shipment of the non-failed angle sensor 1.

If each of the detection signals S31 and S32 is composed only of the ideal component and the angle sensor 1 has not failed, the determination value dLr2 is composed only of the ideal value component. The ideal value component is of a constant value, which specifically is 0, regardless of the angle θ to be detected.

In the cases other than when each of the detection signals S31 and S32 is composed only of the ideal component and the angle sensor 1 has not failed, the determination value dLr2 may differ from the value of the ideal value component. If the determination value dLr2 differs from the value of the ideal value component, the determination value dLr2 can vary depending on the angle θ to be detected.

If each of the detection signals S31 and S32 contains an error component, the determination value dLr2 varies depending on the angle θ to be detected when the angle sensor 1 is in the predetermined condition, i.e., the normal condition. In such a case, the determination value dLr2 can be said to contain an ideal value component and a variation component, the variation component varying depending on the angle θ to be detected. The variation of the determination value dLr2 when the angle sensor 1 is in the predetermined condition results from the error components of the detection signals S31 and S32.

In the present embodiment, the determination unit 242 defines one determination range, a first threshold value TH41, and a second threshold value TH42. The first threshold value TH41 represents the lower end of the determination range, and the second threshold value value TH42 represents the upper end of the determination range. The determination range thus extends from the first threshold value TH41 to the second threshold value TH42.

Hereinafter, the breadth of the range over which the determination value dLr2 varies depending on the angle θ to be detected when the angle sensor 1 is in the predetermined condition will be referred to as a determination-value variation range. The determination-value variation range is the difference between a maximum value and a minimum value of the determination value dLr2 when the angle sensor 1 is in the predetermined condition.

The difference between the first threshold value TH41 and the determination value dLr2 when the angle sensor 1 is in the predetermined condition will be referred to as a first gap. The breadth of the range over which the first gap varies depending on the angle θ to be detected will be referred to as a first gap variation range. The first gap variation range is the difference between a maximum value and a minimum value of the first gap. The difference between the second threshold value TH42 and the determination value dLr2 when the angle sensor 1 is in the predetermined condition will be referred to as a second gap. The breadth of the range over which the second gap varies depending on the angle θ to be detected will be referred to as a second gap variation range. The second gap variation range is the difference between a maximum value and a minimum value of the second gap.

The determination unit 242 varies the first and second threshold values TH41 and TH42 so as to make the first and second gap variation ranges smaller than the determination-value variation range.

Now, the first and second threshold values TH41 and TH42 will be specifically described. The first and second threshold values TH41 and TH42 are expressed by the following Eqs. (32) and (33), respectively.

$$TH41 = SV41 + FC4 \quad (32)$$

$$TH42 = SV42 + FC4 \quad (33)$$

SV41 is a first reference value, and SV42 is a second reference value. Both the first and second reference values SV41 and SV42 are constant values. The second reference value SV42 is larger than the first reference value SV41.

FC4 is a threshold-value variation component which varies depending on the angle θ to be detected. The threshold-value variation component FC4 is generated using at least one of the first and second detection signals S31 and S32. In this way, the determination unit 242 varies the first and second threshold values TH41 and TH42 by using at least one of the first and second detection signals S31 and S32.

Now, first and second examples of the threshold-value variation component FC4 will be described. The first example of the threshold-value variation component FC4 is expressed by the following Eq. (34). The right-handed side of Eq. (34) is derived by replacing S21 on the right-handed side of Eq. (28) with S31.

$$FC4 = j \cdot (8 \cdot S31^4 - 8 \cdot S31^2 + 1) + k \qquad (34)$$

The second example of the threshold-value variation component FC4 is expressed by the following Eq. (35). The right-handed side of Eq. (35) is derived by replacing S21 and S23 on the right-handed side of Eq. (29) with S31 and S32, respectively.

$$FC4 = j \cdot (8 \cdot S31^4 - 8 \cdot S31^2 + 1) + m \cdot (8 \cdot S32^4 - 8 \cdot S32^2 + 1) + k \qquad (35)$$

The meanings of the first and second examples of the threshold-value variation component FC4 are the same as those of the first and second examples of the threshold-value variation component FC3 of the third embodiment. As in the third embodiment, the values of the coefficients "j" and "m" are extremely smaller than the amplitude of the ideal component of each of the detection signals S31 and S32, and are each specifically 10% or less of the amplitude of the ideal component of each of the detection signals S31 and S32.

When the determination value dLr2 contains the fourth-order variation component, varying the first and second threshold values TH41 and TH42 using the first or second example of the threshold-value variation component FC4 causes the first and second gap variation ranges to be much smaller than the determination-value variation range.

The determination unit 242 determines that the angle sensor 1 is in the normal condition if the determination value dLr2 falls within the determination range. In other cases, the determination unit 242 determines that the angle sensor 1 has failed. The determination unit 242 outputs a signal indicating the determination result. The first and second reference values SV41 and SV42 are determined to enable detection of such a failure of the angle sensor 1 that the angular error AE exceeds an allowable range, as in the first embodiment, for example.

A condition determination method according to the present embodiment will now be described. The condition determination method according to the present embodiment is a method for determining whether the angle sensor 1 according to the present embodiment is in a predetermined condition, i.e., the normal condition. The condition determination method is performed by the condition determination apparatus 204 according to the present embodiment.

The condition determination method according to the present embodiment is basically as shown in the flowchart of FIG. 8. In step S101 of the present embodiment, the determination value dLr2 is generated by performing an operation using the detection signals S31 and S32. Step S101 of the present embodiment is performed by the determination value generation unit 241 shown in FIG. 22. The details of step S101 are the same as the details of the operation of the determination value generation unit 241 described previously.

In step S102 of the present embodiment, the angle sensor 1 is determined to be in the normal condition if the determination value dLr2 falls within the determination range. In other cases, the angle sensor 1 is determined to have failed. Step S102 of the present embodiment is performed by the determination unit 242 shown in FIG. 22. The details of step S102 are the same as the details of the operation of the determination unit 242 described previously.

Like the third embodiment, the present embodiment allows the first and second gap variation ranges to be much smaller than the determination-value variation range. The present embodiment thus enables accurate determination of the condition of the angle sensor 1, i.e., whether the angle sensor 1 has failed.

Suppose that the threshold-value variation component FC4 expressed by Eq. (34) is employed and there occurs such a failure of the angle sensor 1 that the detection signal S31 changes from that in the normal condition. In such a case, the threshold-value variation component FC4 changes from that in the normal condition. However, the value of the coefficient "j" in Eq. (34) is extremely smaller than the amplitude of the ideal component of the detection signal S31. Thus, in the event of such a failure of the angle sensor 1 that the detection signal S31 changes from that in the normal condition, the amount of change of the threshold-value variation component FC4 is extremely smaller than that of the determination value dLr2. It is thus possible to accurately detect the failure of the angle sensor 1 by using the determination range defined by the first and second threshold values TH41 and TH42 even in the event of the aforementioned failure.

Also, suppose that the threshold-value variation component FC4 expressed by Eq. (35) is employed and there occurs such a failure of the angle sensor 1 that the detection signal S31 or S32 changes from that in the normal condition. In such a case, the threshold-value variation component FC4 changes from that in the normal condition. However, the values of the coefficients "j" and "m" in Eq. (35) are extremely smaller than the amplitudes of the ideal components of the detection signals S31 and S32. Thus, in the event of such a failure of the angle sensor 1 that the detection signal S31 or S32 changes from that in the normal condition, the amount of change of the threshold-value variation component FC4 is extremely smaller than that of the determination value dLr2. It is thus possible to accurately detect the failure of the angle sensor 1 by using the determination range defined by the first and second threshold values TH41 and TH42 even in the event of the aforementioned failure.

The other configuration, function, and effects of the fourth embodiment are the same as those of the third embodiment.

The present invention is not limited to the foregoing embodiments, and various modifications may be made thereto. For example, the present invention is applicable not only to a magnetic angle sensor but to any physical quantity information generation apparatuses for generating information having a correspondence with a predetermined physical quantity. Examples of the physical quantity information generation apparatuses other than a magnetic angle sensor include an optical angle sensor, an inductance-type potentiometer, and a resolver.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:

1. A condition determination apparatus for determining a condition of a physical quantity information generation apparatus for generating information having a correspondence with a predetermined physical quantity, the condition determination apparatus comprising:
   a determination value generation unit for generating at least one determination value corresponding to the condition of the physical quantity information generation apparatus; and
   a determination unit for determining whether the physical quantity information generation apparatus is in a predetermined condition by determining whether the at least one determination value falls within a determination range, wherein when the physical quantity information generation apparatus is in the predetermined condition, the at least one determination value varies depending on the predetermined physical quantity, and the determination unit defines at least one threshold value that represents at least one end of the determination range, and varies the at least one threshold value so as to bring a variation of a difference between the at least one threshold value and the at least one determination value depending on the predetermined physical quantity when the physical quantity information generation apparatus is in the predetermined condition into a narrower range than a range over which the at least one determination value varies depending on the predetermined physical quantity when the physical quantity information generation apparatus is in the predetermined condition.

2. The condition determination apparatus according to claim 1, wherein the predetermined condition is a condition in which the physical quantity information generation apparatus has not failed.

3. The condition determination apparatus according to claim 1, wherein the predetermined physical quantity is an angle to be detected;

the physical quantity information generation apparatus is an angle sensor including a detection signal generation unit and an angle detection unit, the detection signal generation unit generates a plurality of detection signals each having a correspondence with the angle to be detected, the angle detection unit performs an operation using the plurality of detection signals to generate a detected angle value having a correspondence with the angle to be detected, as the information having a correspondence with the predetermined physical quantity, the determination value generation unit generates the at least one determination value by performing an operation using the plurality of detection signals, and the determination unit varies the at least one threshold value by using at least one of the plurality of detection signals.

4. The condition determination apparatus according to claim 3, wherein the angle to be detected is an angle that a direction of a rotating magnetic field in a reference position forms with respect to a reference direction.

5. The condition determination apparatus according to claim 3, wherein when the angle to be detected varies with a predetermined period, each of the plurality of detection signals contains an ideal component which varies periodically in such a manner as to trace an ideal sinusoidal curve, and an error component, the ideal components of the plurality of detection signals are different in phase from each other and have a predetermined phase relationship with each other, and the variation of the at least one determination value when the physical quantity information generation apparatus is in the predetermined condition results from the error component.

6. The condition determination apparatus according to claim 5, wherein the plurality of detection signals are a first, a second and a third detection signal of which the ideal components are different in phase from each other by 120°, the at least one determination value is one determination value, and the determination value generation unit generates the one determination value by performing an operation including determining a sum of the first to third detection signals.

7. The condition determination apparatus according to claim 5, wherein the plurality of detection signals are a first, a second, a third and a fourth detection signal, the ideal components of the first and second detection signals being different in phase from each other by 180°, the ideal components of the third and fourth detection signals being different in phase from each other by 180°, the ideal components of the first and third detection signals are different in phase from each other by 90°, the at least one determination value is a first and a second determination value, and the determination value generation unit generates the first determination value by performing an operation including determining a sum of the first detection signal and the second detection signal, and generates the second determination value by performing an operation including determining a sum of the third detection signal and the fourth detection signal.

8. The condition determination apparatus according to claim 5, wherein the plurality of detection signals are a first, a second, a third and a fourth detection signal, the ideal components of the first and second detection signals being different in phase from each other by 180°, the ideal components of the third and fourth detection signals being different in phase from each other by 180°, the ideal components of the first and third detection signals are different in phase from each other by 90°, the at least one determination value is one determination value, and the determination value generation unit generates the one determination value by performing an operation including determining a sum of a square of a difference between the first detection signal and the second detection signal and a square of a difference between the third detection signal and the fourth detection signal.

9. The condition determination apparatus according to claim 5, wherein the plurality of detection signals are a first detection signal and a second detection signal of which the ideal components are different in phase from each other by 90°, the at least one determination value is one determination value, and the determination value generation unit generates the one determination value by performing an operation including determining a sum of a square of the first detection signal and a square of the second detection signal.

10. A condition determination method for determining a condition of a physical quantity information generation apparatus for generating information having a correspondence with a predetermined physical quantity, comprising:

a step of generating at least one determination value corresponding to the condition of the physical quantity information generation apparatus; and a determination step of determining whether the physical quantity information generation apparatus is in a predetermined condition by determining whether the at least one determination value falls within a determination range, wherein when the physical quantity information generation apparatus is in the predetermined condition, the at least one determination value varies depending on the predetermined physical quantity, and the determination step defines at least one threshold value that represents at least one end of the determination range, and varies the at least one threshold value so as to bring a variation of a difference between the at least one threshold value and the at least one determination value depending on the predetermined physical quantity when the physical quantity information generation apparatus is in the predetermined condition into a narrower range than a range over which the at least one determination value varies depending on the predetermined physical quantity when the physical quantity information generation apparatus is in the predetermined condition.

11. The condition determination method according to claim 10, wherein the predetermined condition is a condition in which the physical quantity information generation apparatus has not failed.

12. The condition determination method according to claim 10, wherein the predetermined physical quantity is an angle to be detected, the physical quantity information generation apparatus is an angle sensor including a detection signal generation unit and an angle detection unit, the detection signal generation unit generates a plurality of detection signals each having a correspondence with the angle to be detected, the angle detection unit performs an operation using the plurality of detection signals to generate a detected angle value having a correspondence with the angle to be detected, as the information having a correspondence with the predetermined physical quantity, the at least one determination value is generated by an operation using the plurality of detection signals, and the determination step varies the at least one threshold value by using at least one of the plurality of detection signals.

13. The condition determination method according to claim 12, wherein the angle to be detected is an angle that a direction of a rotating magnetic field in a reference position forms with respect to a reference direction.

14. The condition determination method according to claim 12, wherein when the angle to be detected varies with a predetermined period, each of the plurality of detection signals contains an ideal component which varies periodically in such a manner as to trace an ideal sinusoidal curve, and an error component, the ideal components of the plurality of detection signals are different in phase from each other and have a predetermined phase relationship with each other, and the variation of the at least one determination value when the physical quantity information generation apparatus is in the predetermined condition results from the error component.

15. The condition determination method according to claim 14, wherein the plurality of detection signals are a first, a second and a third detection signal of which the ideal components are different in phase from each other by 120°, the at least one determination value is one determination value, and the one determination value is generated by an operation including determining a sum of the first to third detection signals.

16. The condition determination method according to claim 14, wherein the plurality of detection signals are a first, a second, a third and a fourth detection signal, the ideal components of the first and second detection signals being different in phase from each other by 180°, the ideal components of the third and fourth detection signals being different in phase from each other by 180°, the ideal components of the first and third detection signals are different in phase from each other by 90°, the at least one determination value is a first and a second determination value, and the first determination value is generated by an operation including determining a sum of the first detection signal and the second detection signal, and the second determination value is generated by an operation including determining a sum of the third detection signal and the fourth detection signal.

17. The condition determination method according to claim 14, wherein the plurality of detection signals are a first, a second, a third and a fourth detection signal, the ideal components of the first and second detection signals being different in phase from each other by 180°, the ideal components of the third and fourth detection signals being different in phase from each other by 180°, the ideal components of the first and third detection signals are different in phase from each other by 90°, the at least one determination value is one determination value, and the one determination value is generated by an operation including determining a sum of a square of a difference between the first detection signal and the second detection signal and a square of a difference between the third detection signal and the fourth detection signal.

18. The condition determination method according to claim 14, wherein the plurality of detection signals are a first detection signal and a second detection signal of which the ideal components are different in phase from each other by 90°, the at least one determination value is one determination value, and the one determination value is generated by an operation including determining a sum of a square of the first detection signal and a square of the second detection signal.

19. A physical quantity information generation apparatus comprising:

a physical quantity information generation unit for generating information having a correspondence with a predetermined physical quantity; and a condition determination apparatus, the condition determination apparatus including:

a determination value generation unit for generating at least one determination value corresponding to a condition of the physical quantity information generation apparatus; and a determination unit for determining whether the physical quantity information generation apparatus is in a predetermined condition by determining whether the at least one determination value falls within a determination range, wherein when the physical quantity information generation apparatus is in the predetermined condition, the at least one determination value varies depending on the predetermined physical quantity, and the determination unit defines at least one threshold value that represents at least one end of the determination range, and varies the at least one threshold value so as to bring a variation of a difference between the at least one threshold value and the at least one determination value depending on the predetermined physical quantity when the physical quantity information generation apparatus is in the predetermined condition into a narrower range than a range over which the at least one determination value varies depending on the predetermined physical quantity when the physical quantity information generation apparatus is in the predetermined condition.

20. The physical quantity information generation apparatus according to claim 19, wherein the predetermined condition is a condition in which the physical quantity information generation apparatus has not failed.

21. An angle sensor comprising: a detection signal generation unit; an angle detection unit; and a condition determination apparatus, the detection signal generation unit being configured to generate a plurality of detection signals each having a correspondence with an angle to be detected, the angle detection unit being configured to perform an operation using the plurality of detection signals to generate a detected angle value having a correspondence with the angle to be detected, the condition determination apparatus including:
a determination value generation unit for generating at least one determination value corresponding to a condition of the angle sensor; and
a determination unit for determining whether the angle sensor is in a predetermined condition by determining whether the at least one determination value falls within a determination range, wherein when the angle sensor is in the predetermined condition, the at least one determination value varies depending on the angle to be detected, and the determination unit defines at least one threshold value that represents at least one end of the determination range, and varies the at least one threshold value so as to bring a variation of a difference between the at least one threshold value and the at least one determination value depending on the angle to be detected when the angle sensor is in the predetermined condition into a narrower range than a range over which the at least one determination value varies depending on the angle to be detected when the angle sensor is in the predetermined condition.

22. The angle sensor according to claim 21, wherein the predetermined condition is a condition in which the angle sensor has not failed.

23. The angle sensor according to claim 21, wherein
the determination value generation unit generates the at least one determination value by performing an operation using the plurality of detection signals, and
the determination unit varies the at least one threshold value by using at least one of the plurality of detection signals.

24. The angle sensor according to claim 23, wherein
the angle to be detected is an angle that a direction of a rotating magnetic field in a reference position forms with respect to a reference direction, the detection signal generation unit includes a plurality of detection circuits for generating the plurality of detection signals, and
each of the plurality of detection circuits includes at least one magnetic detection element for detecting the rotating magnetic field.

25. The angle sensor according to claim 24, wherein
the at least one magnetic detection element includes a plurality of magnetoresistance elements connected in series, and
each of the plurality of magnetoresistance elements includes a magnetization pinned layer whose magnetization direction is pinned, a free layer whose magnetization direction varies depending on the direction of the rotating magnetic field, and a nonmagnetic layer located between the magnetization pinned layer and the free layer.

26. The angle sensor according to claim 23, wherein
when the angle to be detected varies with a predetermined period, each of the plurality of detection signals contains an ideal component which varies periodically in such a manner as to trace an ideal sinusoidal curve, and an error component,
the ideal components of the plurality of detection signals are different in phase from each other and have a predetermined phase relationship with each other, and
the variation of the at least one determination value when the angle sensor is in the predetermined condition results from the error component.

27. The angle sensor according to claim 26, wherein
the plurality of detection signals are a first, a second and a third detection signal of which the ideal components are different in phase from each other by 120°,
the at least one determination value is one determination value, and
the determination value generation unit generates the one determination value by performing an operation including determining a sum of the first to third detection signals.

28. The angle sensor according to claim 26, wherein
the plurality of detection signals are a first, a second, a third and a fourth detection signal, the ideal components of the first and second detection signals being different in phase from each other by 180°, the ideal components of the third and fourth detection signals being different in phase from each other by 180°,
the ideal components of the first and third detection signals are different in phase from each other by 90°,
the at least one determination value is a first and a second determination value, and
the determination value generation unit generates the first determination value by performing an operation including determining a sum of the first detection signal and the second detection signal, and generates the second determination value by performing an operation including determining a sum of the third detection signal and the fourth detection signal.

29. The angle sensor according to claim 26, wherein
the plurality of detection signals are a first, a second, a third and a fourth detection signal, the ideal components of the first and second detection signals being different in phase from each other by 180°, the ideal components of the third and fourth detection signals being different in phase from each other by 180°,
the ideal components of the first and third detection signals are different in phase from each other by 90°, the at least one determination value is one determination value, and the determination value generation unit generates the one determination value by performing an operation including determining a sum of a square of a difference between the first detection signal and the second detection signal and a square of a difference between the third detection signal and the fourth detection signal.

30. The angle sensor according to claim 26, wherein the plurality of detection signals are a first detection signal and a second detection signal of which the ideal components are different in phase from each other by 90°, the at least one determination value is one determination value, and the determination value generation unit generates the one determination value by performing an operation including determining a sum of a square of the first detection signal and a square of the second detection signal.

\* \* \* \* \*